(12) United States Patent
Ikuma et al.

(10) Patent No.: US 10,194,105 B2
(45) Date of Patent: Jan. 29, 2019

(54) SOLID-STATE IMAGING DEVICE AND CAMERA FOR SUPPRESSING VERTICAL LINE NOISE

(71) Applicant: PANASONIC INTELLECTUAL PROPERTY MANAGEMENT CO., LTD., Osaka (JP)

(72) Inventors: Makoto Ikuma, Kyoto (JP); Manabu Tsunoda, Kyoto (JP); Kenji Watanabe, Kyoto (JP); Kenichi Haga, Osaka (JP); Masaru Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/636,088

(22) Filed: Jun. 28, 2017

(65) Prior Publication Data
US 2017/0302869 A1    Oct. 19, 2017

Related U.S. Application Data

(63) Continuation of application No. PCT/JP2016/000317, filed on Jan. 22, 2016.

(30) Foreign Application Priority Data

Jan. 28, 2015   (JP) .................................. 2015-014822

(51) Int. Cl.
*H04N 5/335* (2011.01)
*H04N 3/14* (2006.01)
(Continued)

(52) U.S. Cl.
CPC ........... *H04N 5/365* (2013.01); *H04N 5/3658* (2013.01); *H04N 5/374* (2013.01); *H04N 5/378* (2013.01)

(58) Field of Classification Search
CPC .... H04N 5/3658; H04N 5/365; G09G 3/2048; H03M 1/12; H03M 1/001; H03M 1/02; H03M 1/10; H03M 1/004
See application file for complete search history.

(56) References Cited

U.S. PATENT DOCUMENTS 4,220,965 A * 9/1980 Heitmann ................ H04N 9/74
                                                      348/580
6,787,752 B2 * 9/2004 Tsai ..................... H03M 1/0673
                                                      250/208.1

(Continued)

FOREIGN PATENT DOCUMENTS

JP    2006-340358 A    12/2006
JP    2008-060872 A     3/2008
(Continued)

OTHER PUBLICATIONS

Extended Search Report issued in corresponding European Patent Application No. 16742956.2, dated Dec. 20, 2017.
(Continued)

*Primary Examiner* — Chia Wei A Chen
(74) *Attorney, Agent, or Firm* — McDermott Will & Emery LLP

(57) ABSTRACT

A solid-state imaging device includes: a pixel array including a plurality of pixel circuits arranged in rows and columns; a vertical signal line that is provided for each of the columns and transmits pixel signals; a column AD circuit that is provided for each of the columns and AD converts the pixel signals from the vertical signal line; a column-switching circuit that is interposed in the vertical signal line between the pixel array and the column AD circuit and switches connection between the vertical signal line and the column AD circuit; a controller that causes the column-switching circuit to switch the connection for every horizontal scan period; and a restoration circuit that restores
(Continued)

ordering of the AD converted signals so as to correspond to ordering in which the vertical signal lines are arranged in the pixel array.

14 Claims, 16 Drawing Sheets

(51) Int. Cl.
| | |
|---|---|
| *H03M 1/12* | (2006.01) |
| *H04N 5/217* | (2011.01) |
| *H04N 5/365* | (2011.01) |
| *H04N 5/378* | (2011.01) |
| *H04N 5/374* | (2011.01) |

(56) References Cited

U.S. PATENT DOCUMENTS

| | | | | |
|---|---|---|---|---|
| 6,911,641 B2* | 6/2005 | Tsai | ................. | H03M 1/0673 |
| | | | | 250/208.1 |
| 8,339,495 B2* | 12/2012 | Sugai | ................. | H04N 5/3658 |
| | | | | 348/308 |
| 9,066,030 B2* | 6/2015 | Kim | ................. | H04N 5/335 |
| 2003/0052982 A1* | 3/2003 | Chieh | ................. | H04N 3/1568 |
| | | | | 348/302 |
| 2003/0058137 A1* | 3/2003 | Tsai | ................. | H03M 1/0673 |
| | | | | 341/1 |
| 2004/0251397 A1* | 12/2004 | Tsai | ................. | H03M 1/0673 |
| | | | | 250/208.1 |
| 2006/0268137 A1 | 11/2006 | Myers | | |
| 2008/0036890 A1* | 2/2008 | Yamashita | ........... | H04N 5/3598 |
| | | | | 348/308 |
| 2008/0055432 A1 | 3/2008 | Koseki | | |
| 2009/0147089 A1* | 6/2009 | Tonkikh | ............... | H04N 5/3658 |
| | | | | 348/207.99 |
| 2010/0277623 A1* | 11/2010 | Tejada | ............... | H04N 5/35554 |
| | | | | 348/241 |
| 2011/0019025 A1 | 1/2011 | Koseki | | |
| 2011/0141324 A1 | 6/2011 | Koseki | | |
| 2012/0062772 A1* | 3/2012 | Osawa | ................. | H04N 5/341 |
| | | | | 348/300 |
| 2012/0119064 A1 | 5/2012 | Cieslinski | | |
| 2012/0287719 A1* | 11/2012 | Mun | ................. | G11C 16/0483 |
| | | | | 365/185.18 |
| 2013/0044250 A1* | 2/2013 | Senda | ................. | H04N 5/32 |
| | | | | 348/333.01 |
| 2013/0087688 A1* | 4/2013 | Saito | ................. | H03K 3/0231 |
| | | | | 250/208.1 |
| 2014/0092277 A1* | 4/2014 | Kannermark | ........ | H04N 5/2357 |
| | | | | 348/226.1 |
| 2014/0231620 A1* | 8/2014 | Oike | ................. | H03M 3/458 |
| | | | | 250/208.1 |
| 2015/0124138 A1* | 5/2015 | Ueda | ................. | H04N 5/3575 |
| | | | | 348/308 |
| 2016/0064442 A1* | 3/2016 | Takada | ............. | H01L 27/14603 |
| | | | | 250/208.1 |
| 2016/0227144 A1* | 8/2016 | Gendai | ................. | H04N 5/374 |
| 2017/0180655 A1* | 6/2017 | Kaneko | ................. | H04N 5/357 |
| 2017/0214864 A1* | 7/2017 | Izuha | ................. | H04N 5/345 |

FOREIGN PATENT DOCUMENTS

| | | |
|---|---|---|
| JP | 2010-109565 A | 5/2010 |
| JP | 2010-130194 A | 6/2010 |
| WO | 2012/144218 A1 | 10/2012 |

OTHER PUBLICATIONS

Snoeij, M. et al. "A CMOS Imager with Column-Level ADC Using Dynamic Column FPN Reduction." 2006 IEEE International Solid-State Circuits Conference; Feb. 5-9, 2006; San Francisco, CA, USA; Session 27, Image Sensors, 27.4.

International Search Report and Written Opinion issued in International Patent Application No. PCT/JP2016/000317, dated Mar. 15, 2016; with partial English translation.

European Communication under Rule 71(3) EPC, issued in European Patent Application No. 16 742 956.2, dated Aug. 1, 2018.

* cited by examiner

| C | | | | ADIN | | | |
|---|---|---|---|---|---|---|---|
| 0 | 1 | 2 | 3 | 0 | 1 | 2 | 3 |
| 0 | 0 | 0 | 0 | H0 | H2 | H1 | H3 |
| 0 | 0 | 0 | 1 | H0 | H2 | H3 | H1 |
| 0 | 0 | 1 | 0 | H2 | H0 | H1 | H3 |
| 0 | 0 | 1 | 1 | H2 | H0 | H3 | H1 |
| 0 | 1 | 0 | 0 | H0 | H3 | H1 | H2 |
| 0 | 1 | 0 | 1 | H0 | H3 | H2 | H1 |
| 0 | 1 | 1 | 0 | H3 | H0 | H1 | H2 |
| 0 | 1 | 1 | 1 | H3 | H0 | H2 | H1 |
| 1 | 0 | 0 | 0 | H1 | H2 | H0 | H3 |
| 1 | 0 | 0 | 1 | H1 | H2 | H3 | H0 |
| 1 | 0 | 1 | 0 | H2 | H1 | H0 | H3 |
| 1 | 0 | 1 | 1 | H2 | H1 | H3 | H0 |
| 1 | 1 | 0 | 0 | H1 | H3 | H0 | H2 |
| 1 | 1 | 0 | 1 | H1 | H3 | H2 | H0 |
| 1 | 1 | 1 | 0 | H3 | H1 | H0 | H2 |
| 1 | 1 | 1 | 1 | H3 | H1 | H2 | H0 |

FIG. 5A
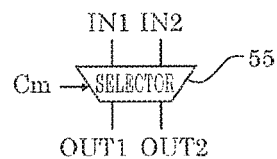
FIG. 5B
| Cm | OUT1 | OUT2 |
|----|------|------|
| 0  | IN1  | IN2  |
| 1  | IN2  | IN1  |
FIG. 5C
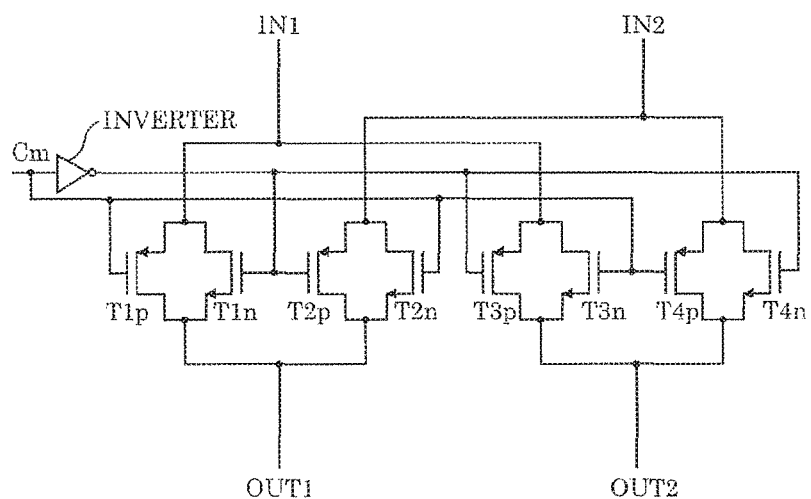

FIG. 6B

| 0 | 1 | 2 | 3 | 4 | 5 | C 6 | 7 | 8 | 9 | 10 | 11 | 0 | 1 | 2 | ADIN 3 | 4 | 5 | 6 | 7 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | H0 | H4 | H2 | H6 | H1 | H5 | H3 | H7 |
| 0 | 0 | 0 | 0 | 0 | 0 | 0 | 0 | 0 | 0 | 0 | 1 | H0 | H4 | H2 | H6 | H1 | H5 | H7 | H3 |
| 0 | 0 | 0 | 0 | 0 | 0 | 0 | 0 | 0 | 0 | 1 | 0 | H0 | H4 | H2 | H6 | H5 | H1 | H3 | H7 |
| 0 | 0 | 0 | 0 | 0 | 0 | 0 | 0 | 0 | 0 | 1 | 1 | H0 | H4 | H2 | H6 | H5 | H1 | H7 | H3 |
| 1 | 1 | 1 | 1 | 1 | 1 | 1 | 1 | 1 | 1 | 1 | 1 | H7 | H3 | H5 | H1 | H6 | H2 | H4 | H0 |

SOLID-STATE IMAGING DEVICE AND CAMERA FOR SUPPRESSING VERTICAL LINE NOISE

CROSS REFERENCE TO RELATED APPLICATIONS

This application is a U.S. continuation application of PCT International Patent Application Number PCT/JP2016/000317 filed on Jan. 22, 2016, claiming the benefit of priority of Japanese Patent Application Number 2015-014822 filed on Jan. 28, 2015, the entire contents of which are hereby incorporated by reference.

BACKGROUND

1. Technical Field

The present disclosure relates to a solid-state imaging device, and a camera.

2. Description of the Related Art

In a column-parallel output-type solid-state imaging device, signals of the same column are analog-to-digital (AD) converted by the same processing circuit provided for each column. Nonuniformities in the processing circuits each provided for each column and column noise inherently have column correlation. Such noise and nonuniformities may appear as vertical line noise on an image.

Japanese Unexamined Patent Application Publication No. 2008-60872 (hereinafter, referred to as PTL 1) proposes a solid-state imaging device including; a noise adder that adds time invariable and two-dimensional random noise to pixel signals transmitted via vertical signal lines for reading the pixel signals from a pixel array; and an AD converter that independently converts, to digital data, a reference level and a signal level, the reference level and the signal level being included in each of the pixel signals to which noise has been added by the noise adder. According to this technique, when the reference level and the signal level are independently converted to digital data while the time invariable and two-dimensional random noise is added, the effect of noise appears similarly in both results of AD conversion. Because the results of AD conversion have two-dimensional random noise, they do not have column correlated noise.

Also, "A CMOS Imager with Column-Level ADC Using Dynamic Column FPN Reduction" (M. F. Snoeij, A. Theuwissen, K. Makinwa, J. H. Huijsing, ISSCC 2006/SESSION 27/IMAGE SENSORS/27.4) (hereinafter, referred to as NPL 1) proposes a solid-state imaging device that reduces vertical line noise by randomly switching a switching matrix that is provided between a pixel array and a column processing circuit (a column sample and hold circuit and a column AD converter).

SUMMARY

With the solid-state imaging device disclosed in PTL 1, highly column correlated vertical line noise can be suppressed by superimposing noise on the pixel signal itself. However, because a pixel reset signal is connected commonly to all columns, equivalent noise is superimposed commonly to all columns, which increases row correlation and generates random horizontal line noise. Also, it is necessary to adjust the amount of superimposed noise between low gain and high gain, and it is necessary to control the release time of the reset signal in a step-wise manner according to AD conversion gain. For this reason, it is necessary to set in advance optimal values by including threshold values of transistors in pixels, temperature characteristics of parasitic elements in the pixel array, and nonuniformities in voltage characteristics, but adjustment is very difficult. Accordingly, it is desirable to use a different approach for reducing vertical line noise.

The solid-state imaging device disclosed in NPL 1 is problematic in that only three adjacent columns can be switched, and thus it is ineffective on vertical line noise generated in a cycle of every three columns or more.

The present disclosure has been made in view of the circumstances as described above, and the present disclosure provides a solid-state imaging device and a camera that suppress vertical line noise that appears on images caused by column-correlated noise and nonuniformities.

In order to solve the problem described above, a solid-state imaging device according to an aspect of the present disclosure includes: a pixel array including a plurality of pixel circuits arranged in rows and columns; a vertical signal line that is provided for each of the columns and transmits a pixel signal output from the plurality of pixel circuits; a column AD circuit that is provided for each of the columns and analog-to-digital (AD) converts the pixel signal from the vertical signal line; a column-switching circuit that is interposed in a plurality of the vertical signal lines between the pixel array and a plurality of the column AD circuits and switches connections between the columns of the pixel circuits in the pixel array and the plurality of the column AD circuits; a controller that causes the column-switching circuit to switch the connections for every horizontal scan period; and a restoration circuit that restores ordering of the signals AD converted by the plurality of the column AD circuits so as to correspond to ordering in which the plurality of the vertical signal lines are arranged in the pixel array.

With the solid-state imaging device and the camera according to the present disclosure, it is possible to suppress vertical line noise that appears on images caused by column-correlated noise and nonuniformities.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5A is a block diagram showing a two-input two-output selector according to Embodiment 1;

FIG. 5B is a diagram showing an input/output logic of the two-input two-output selector according to Embodiment 1;

FIG. 5C is a circuit diagram showing a specific example of the two-input two-output selector according to Embodiment 1;

FIG. 6B is a diagram showing a switch logic of the eight-input eight-output unit switching circuit according to Embodiment 1;

DETAILED DESCRIPTION OF THE EMBODIMENTS

Hereinafter, a solid-state imaging device for carrying out the present disclosure will be described with reference to the drawings.

It is to be noted however that an excessively detailed description may be omitted.

For example, a detailed description of already well-known matters and an overlapping description of substantially the same structural elements may be omitted. This is to avoid the following description from being unnecessarily lengthy and to facilitate the understanding of a person having ordinary skill in the art. The accompanying drawings and the following description are presented for a person having ordinary skill in the art to sufficiently understand the present disclosure, and thus are not intended to limit the subject matter of the claims.

Embodiment 1

First, an overview of a solid-state imaging device according to Embodiment 1 will be described. The solid-state imaging device according to the present embodiment is configured to reduce vertical line noise by switching the correspondence relationship between columns of pixel circuits in a pixel array including a plurality of pixel circuits (unit cells or unit pixel cells) that are arranged in rows and columns and columns of column AD circuits provided for each vertical signal line.

[Configuration Example of Solid-State Imaging Device]

A configuration of the solid-state imaging device according to Embodiment 1 will be described next with reference to the drawings.

Figure 1:
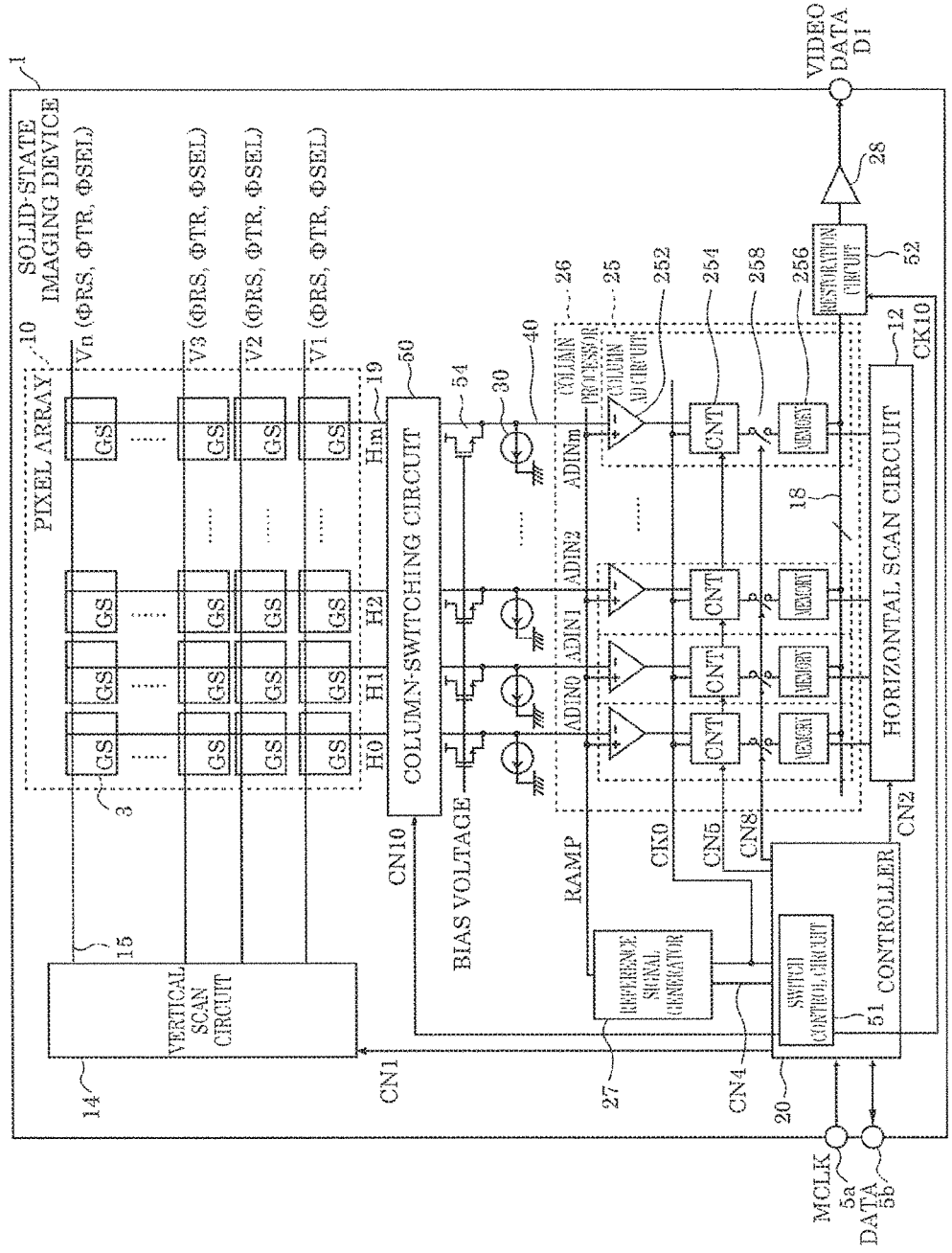
FIG. 1 is a block diagram showing a configuration example of a solid-state imaging device according to Embodiment 1.

FIG. 1 is a block diagram showing a configuration example of solid-state imaging device 1 according to Embodiment 1. Solid-state imaging device 1 shown in the diagram includes pixel array 10, horizontal scan circuit 12, vertical scan circuit 14, a plurality of vertical signal lines 19, controller 20, column processor 26, reference signal generator 27, output circuit 28, a plurality of load current sources 30, column-switching circuit 50, restoration circuit 52, and a plurality of clip transistors 54. Solid-state imaging device 1 also includes MCLK terminal that receives input of a master clock signal from the outside, DATA terminal for transmitting and receiving commands or data to and from the outside, D1 terminal for transmitting video data to the outside, and the like, and also includes, in addition thereto, terminals to which a power supply voltage and a ground voltage are supplied.

Figure 2:
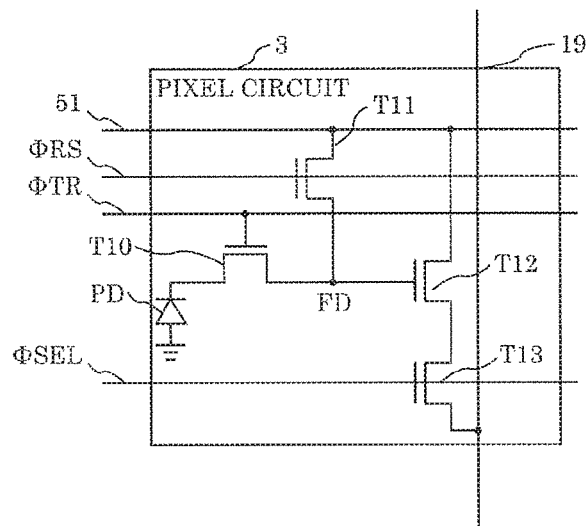
FIG. 2 is a circuit diagram showing an example of a pixel circuit according to Embodiment 1.

Pixel array 10 includes a plurality of pixel circuits 3 that are arranged in rows and columns. In FIG. 1, the plurality of pixel circuits 3 are arranged in n rows and m columns. FIG. 2 is a diagram showing a circuit example of one pixel circuit 3. In FIG. 2, pixel circuit 3 includes photodiode PD that is a pixel (light receiver), floating diffusion layer FD, readout transistor T10, reset transistor T11, amplifier transistor T12, and select transistor T13.

Photodiode PD is a light receiving element that performs photoelectric conversion, and generates electric charges according to the amount of light received.

Floating diffusion layer FD temporarily stores the electric charges read out from photodiode PD via readout transistor T10.

Readout transistor T10 reads out (or in other words transfers) the electric charges from photodiode PD to floating diffusion layer FD in accordance with a readout control signal of readout control line ΦTR.

Reset transistor T11 resets the electric charges of floating diffusion layer FD in accordance with a reset control signal of reset control line ΦRS.

Amplifier transistor T12 converts the electric charges of floating diffusion layer FD to a voltage, performs amplification, and outputs an amplified signal to vertical signal line 19 via select transistor T13 as a pixel signal.

Select transistor T13 selects whether or not to output a pixel signal of amplifier transistor T12 to a vertical signal line in accordance with a select control signal of select control line ΦSEL.

FIG. 2 shows an example of pixel circuit 3 having a so-called one-pixel one-cell structure, but pixel circuit 3 may have a so-called multiple-pixel one-cell structure. Multiple-pixel one-cell structured pixel circuit 3 may include, for example, a plurality of photodiodes PD, and may be configured such that any one or all of floating diffusion layer FD, reset transistor T11, amplifier transistor T12, and select transistor T13 are shared in a unit cell.

Horizontal scan circuit 12 shown in FIG. 1 sequentially scans memories 256 that are provided in a plurality of column AD circuits, and thereby outputs AD converted pixel signals to restoration circuit 52 via horizontal signal line 18. This scan may be performed in the same order as the ordering in which column AD circuits 25 are arranged.

Vertical scan circuit 14 scans, on a row-by-row basis, horizontal scan line groups 15 (also referred to as row control line groups) that are provided for each row of pixel circuits 3 in pixel array 10. By doing so, vertical scan circuit 14 selects pixel circuits 3 on a row-by-row basis, and causes pixel circuits 3 belonging to the selected row to simultaneously output a pixel signal to m vertical signal lines 19. The number of horizontal scan line groups 15 is the same as the number of rows of pixel circuits 3. In FIG. 1, n horizontal scan line groups 15 (V1, V2, . . . , and Vn in FIG. 1) are provided. Each horizontal scan line group 15 includes reset control line ΦRS, readout control line ΦTR, and select control line ΦSEL.

Vertical signal line 19 is provided for each column of pixel circuits 3 in pixel array 10, and transmits the pixel signal from pixel circuit 3 belonging to the selected row to column AD circuit 25. In FIG. 1, the plurality of vertical signal lines 19 include m vertical signal lines H0 to Hm. Also, column-switching circuit 50 is interposed in the plurality of vertical signal lines 19. Portions of vertical signal lines 19 that are on the downstream of column-switching circuit 50, or in other words, the portions connecting column-switching circuit 50 and minus input terminals of column AD circuits 25 will be referred to as "ADC input lines 40". In FIG. 1, the plurality of ADC input lines 40 include m ADC input lines ADIN0 to ADINm.

Controller 20 performs overall control of solid-state imaging device 1 by generating various types of control signal groups. The various types of control signal groups include control signal groups CN1, CN2, CNS, CN8, CN10, and CN10, and counter clock CK0. For example, controller 20 controls horizontal scan circuit 12, vertical scan circuit 14, and the like by receiving master clock MCLK via terminal 5a and generating various types of internal clocks. Also, controller 20 includes switch control circuit 51. Switch control circuit 51 controls column-switching circuit 50 to switch one-to-one connections between columns of pixel circuits 3 in pixel array 10 and column AD circuits 25 for every horizontal scan period.

Column processor 26 includes column AD circuits 25 that are provided for each column. Each column AD circuit 25 AD converts a pixel signal from vertical signal line 19.

Each column AD circuit 25 includes voltage comparator 252, counter 254, and memory 256.

Voltage comparator 252 compares an analog pixel signal from vertical signal line 19 with reference signal RAMP that has a triangular waveform and is generated by reference signal generator 27, and if, for example, the former is larger than the latter, inverts an output signal indicative of the result of comparison.

Counter 254 counts the time from the start of a change in the triangular waveform of reference signal RAMP until when the output signal of voltage comparator 252 is inverted. The time until when the output signal of voltage comparator 252 is inverted depends on the value of the analog pixel signal, and thus the count value amounts to the value of a digitized pixel signal.

Memory 256 stores the count value of counter 254, or in other words, the digital pixel signal.

Reference signal generator 27 generates reference signal RAMP having a triangular waveform, and outputs reference signal RAMP to a plus input terminal of voltage comparator 252 of each column AD circuit 25.

Output circuit 28 outputs the digital pixel signal from restoration circuit 52 to video data terminal D1.

Load current sources 30 are load circuits that are provided for each vertical signal line 19 and supply a load current to vertical signal lines 19. That is, each load current source 30 supplies a load current to amplifier transistor T12 of selected pixel circuits 3 via vertical signal line 19, and forms a source follower circuit together with amplifier transistor T12.

Column-switching circuit 50 is interposed in vertical signal lines 19 between pixel array 10 and column AD circuits 25, and switches one-to-one connections between columns of pixel circuits 3 in pixel array 10 and column AD circuits 25. The switching is performed in accordance with control signal group CN10 from controller 20. As a result of column-switching circuit 50 switching the correspondence relationship between columns of pixel circuits 3 in pixel array 10 and column AD circuits 25, vertical line noise can be reduced. Column-switching circuit 50 will be further described with reference to FIG. 3.

Figure 3:
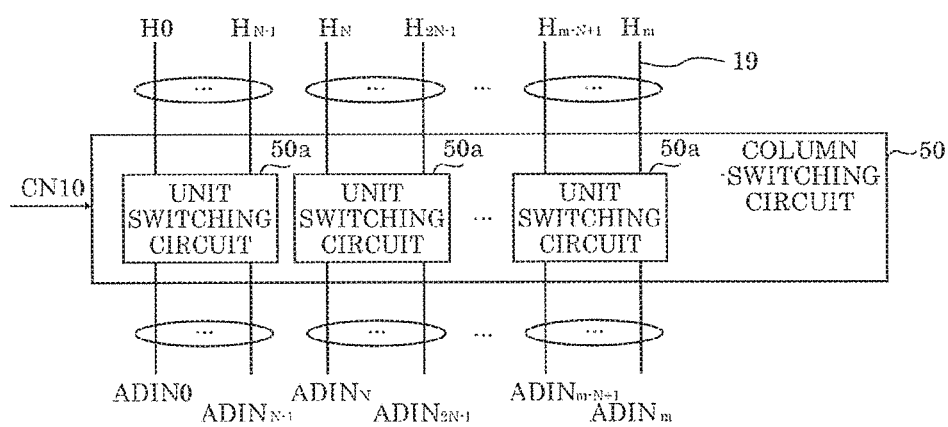
FIG. 3 is a block diagram showing a configuration example of a column-switching circuit according to Embodiment 1.

FIG. 3 is a block diagram showing a configuration example of column-switching circuit 50. Column-switching circuit 50 shown in FIG. 3 includes a plurality of unit switching circuits 50a.

Each unit switching circuit 50a includes N input terminals and N output terminals, where N is an integer of 4 or more. The plurality of vertical signal lines 19 (m vertical signal lines H0 to Hm) are divided into groups of N vertical signal lines 19, and each group corresponds to one unit switching circuit 50a.

N input terminals of unit switching circuit 50a are connected to N vertical signal lines 19 that are on the side where pixel array 10 is provided.

N output terminals of unit switching circuit 50a are connected to N vertical signal lines 19 (or in other words, ADC input lines 40) on the side where the plurality of column AD circuits 25 are provided.

Each unit switching circuit 50a switches internal connections between N input terminals and N output terminals in accordance with control signal group CN10 from controller 20.

As described above, the plurality of (m) vertical signal lines 19 are divided into groups of N vertical signal lines 19, and thus each unit switching circuit 50a corresponding to N vertical signal lines 19 can share the same control signal group CN10. By sharing the control signal group, it is possible to avoid an excessive increase in the number of lines of control signal group CN10. In other words, if N is increased, the number of control signal lines of control signal group CN10 increases, and its interconnection area also increases significantly. That is, the magnitude of N (the effect of reducing vertical line noise) and reducing the interconnection area of control signal group CN10 are in a trade-off relationship. With respect to the trade-off, by appropriately setting N according to the area of a semiconductor chip on which solid-state imaging device 1 is formed and the total number of pixel circuits, the effect of reducing vertical line noise can be obtained.

Restoration circuit 52 shown in FIG. 1 restores the ordering of signals AD converted by the plurality of column AD circuits 25 so as to correspond to the ordering in which the plurality of vertical signal lines 19 are arranged in pixel array 10. The restoration is performed in accordance with control signal group CN10. For example, restoration circuit 52 has a circuit configuration so as to restore the ordering of AD converted pixel signals by completely inverting the relationship between the input and the output of column-switching circuit 50 based on control signal group CN10 output by switch control circuit 51 provided in controller 20. For example, restoration circuit 52 includes a buffer memory for temporarily storing at least N AD converted pixel signals that are sequentially output from memories 256 to horizontal signal line 18 as a result of scanning performed by horizontal scan circuit 12, and restores the ordering of AD converted pixel signals by changing the readout order from the buffer memory based on control signal group CN10.

Clip transistor 54 is provided for each column of a plurality of pixel circuits 3, connected to vertical signal line 19 (or in other words, ADC input line 40) between column-switching circuit 50 and column AD circuit 25, and provides a clip potential to vertical signal line 19 such that load current source 30 is not momentarily turned off while column-switching circuit 50 performs switching. As a result, clip transistor 54 can prevent load current source 30 from being momentarily turned off and on that may occur by column-switching circuit 50 performing switching, thereby preventing the power supply voltage and the ground level from varying, and reducing the occurrence of noise. In other words, clip transistor 54 performs clipping such that load current source 30 is not turned off while column-switching circuit 50 performs switching. This is done so because if load current source 30 is momentarily turned off, the power supply of pixel array 10 and GND undergo transient variations, causing noise. It is possible to perform a setting such that current source 30 is not turned off by appropriately setting a bias voltage that controls a gate voltage.

[Configuration Example of Unit Switching Circuit]

A configuration example of unit switching circuit 50a will be described next in further detail.

Figures 4A, 4B:
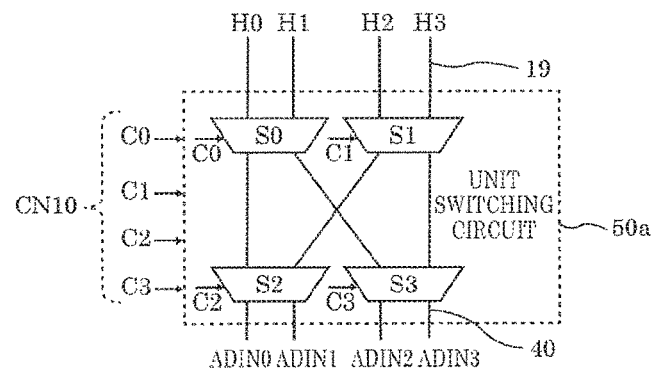
FIG. 4A is a block diagram showing an example of a four-input four-output unit switching circuit according to Embodiment 1.
FIG. 4B is a diagram showing a switch logic of the four-input four-output unit switching circuit according to Embodiment 1.

FIG. 4A is a block diagram showing an example of four-input four-output unit switching circuit 50a. This diagram shows a configuration example of unit switching circuit 50a shown in FIG. 3 when the grouping number N of vertical signal lines 19 is 4.

In FIG. 4A, unit switching circuit 50a includes K×L selectors each having two input terminals and two output terminals (in FIG. 4A, K is 2, L is 2, and grouping number N is 4). K×L selectors are arranged in K columns and L rows.

Input terminals of K selectors in the first row are connected to N (in this example, four) vertical signal lines 19 that are on the side where pixel array 10 is provided.

Output terminals of K selectors in the last row (or in other words, the L-th row) are connected to N vertical signal lines 19 (or in other words, ADC input lines 40) that are on the side where column AD circuits 25 are provided.

Two input terminals of each of the selectors in the second and subsequent rows are connected to the output terminals of different selectors in the previous row.

K×L selectors switch internal connections between two input terminals and two output terminals in accordance with K×L (in this example, four) control signals C0 to C3. Control signal group CN10 that is input into unit switching circuit 50a includes control signals C0 to C3.

FIG. 4B is a diagram showing a switch logic of four-input four-output unit switching circuit 50a shown in FIG. 4A. As shown in the diagram, there are 16 logic value combinations of control signals C0 to C3. Also, as shown in the diagram, there are 16 combinations of ordering vertical signal lines 19 connected to N (in this example, four) ADC input lines 40 that are on the output side of unit switching circuit 50a. That is, unit switching circuit 50a can switch connections in 16 ways according to the logic value combination of control signals C0 to C3.

Theoretically, there are 4!=24 possible permutations of ordering four input vertical signal lines I0 to I13, but unit switching circuit 50a shown in FIG. 4A can switch connections in 16 ways as shown in FIG. 4B out of 24 permutations.

A circuit example of selector 55 will be further described in detail.

FIG. 5A is a block diagram showing two-input two-output selector 55. Selector 55 is an example of each of selectors S0 to S3 shown in FIG. 4A.

FIG. 5B is a diagram showing an input/output logic of two-input two-output selector 55. When control signal Cm is 0, IN1 and IN2 are connected to output terminals OUT1 and OUT2 of selector 55 (referred to as straight connection). When control signal Cm is 1, IN2 and IN1 are connected to output terminals OUT1 and OUT2 of selector 55 (referred to as cross connection).

FIG. 5C is a circuit diagram showing a specific example of the two-input two-output selector. As shown in FIG. 5C, selector 55 includes four transistor pairs and an inverter. A transistor pair composed of PMOS transistor T1p and NMOS transistor T1n will be referred to as a "first transistor pair". Likewise, a second transistor pair is composed of transistors T2p and T2n. A third transistor pair is composed of transistors T3p and T3n. A fourth transistor pair is composed of transistors T4p and T4n.

Two transistors constituting each transistor pair are simultaneously turned on or off. The first transistor pair is turned on or off exclusive of the second transistor pair. The third transistor pair is also turned on or off exclusive of the fourth transistor pair.

By combining n×m selectors 55 as described above, the design and production of unit switching circuit 50a can be facilitated.

[Another Configuration Example of Unit Switching Circuit]

Another configuration example of unit switching circuit 50a will be described next.

Figure 6A:
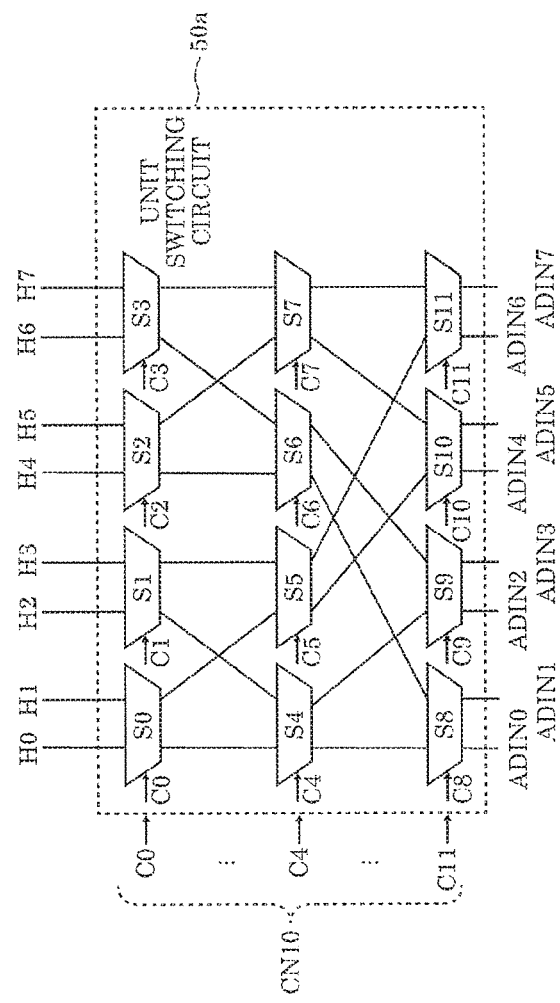
FIG. 6A is a block diagram showing an example of an eight-input eight-output unit switching circuit according to Embodiment 1.

FIG. 6A is a block diagram showing an example of an eight-input eight-output unit switching circuit.

In FIG. 6A, unit switching circuit 50a includes K×L selectors each having two input terminals and two output terminals (in FIG. 6A, K is 4, L is 3, and grouping number N is 8). K×L selectors are arranged in K columns and L rows.

Input terminals of K selectors in the first row are connected to N (in this example, eight) vertical signal lines that are on the side where pixel array 10 is provided.

Output terminals of K selectors in the last row (or in other words, the L-th row) are connected to N vertical signal lines 19 (or in other words, ADC input lines 40) that are on the side where column AD circuits 25 are provided.

Two input terminals of each of the selectors in the second and subsequent rows are connected to the output terminals of different selectors in the previous row.

K×L selectors switch internal connections between two input terminals and two output terminals in accordance with K×L (in this example, 12) control signals C0 to C11. Control signal group CN10 that is input into unit switching circuit 50a includes control signals C0 to C11.

FIG. 6B is a diagram showing a switch logic of eight-input eight-output unit switching circuit 50a shown in FIG. 6A. As shown in the diagram, there are 2048 logic value combinations of control signals C0 to C11. Also, there are 2048 combinations of ordering vertical signal lines 19 connected to N (in this example, eight) ADC input lines 40 that are on the output side of unit switching circuit 50a. That is, unit switching circuit 50a can switch connections in 2048 ways according to the logic value combination of control signals C0 to C11.

Theoretically, there are 8!=40320 possible permutations of ordering eight input vertical signal lines I0 to I7, but unit switching circuit 50a shown in FIG. 6A can switch connections in 2048 ways out of 40320 permutations.

It is desirable to increase grouping number N for each unit switching circuit 50a shown in FIG. 3 so as to have a wide range in order to completely remove the column correlation, but if grouping number N is increased to have a wide range, it leads to an increase in the interconnection area of control signal group CN10. For this reason, it is necessary to select N that provides a wide range but does not increase the interconnection area.

As an example of unit switching circuit 50a, for example, in FIGS. 5A, 5B and 5C, selector 55 is shown that is composed of an analog switch in which PMOS transistors and NMOS transistors are combined in a plurality of pairs. In FIGS. 4A and 4B, an example of grouping where N=4 by combining K×L selectors 55 as described above is shown. In FIGS. 6A and 6B, an example of grouping where N=8 is shown. By combining K×L selectors 55 in this way, the design and production of unit switching circuit 50a can be facilitated.

[Operations of Solid-State Imaging Device]

The following presents a description of operations of solid-state imaging device 1 configured as described above.

Figure 7:
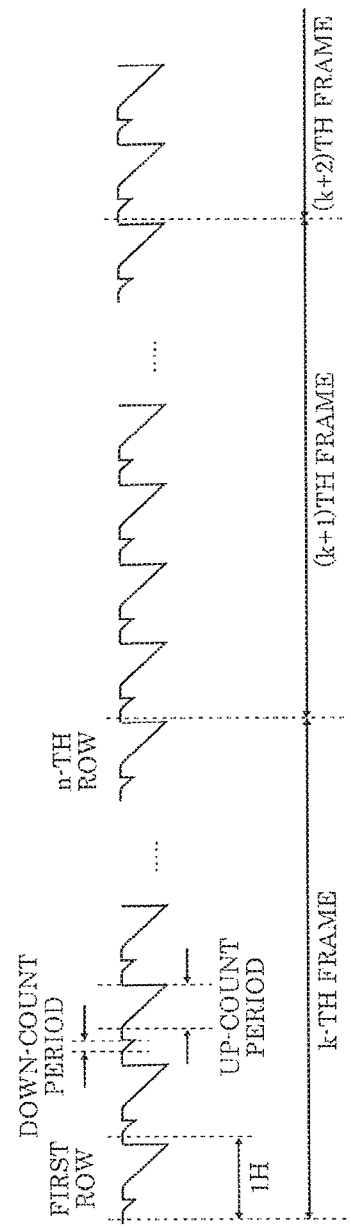
FIG. 7 is a time chart showing an example of operations of the solid-state imaging device according to Embodiment 1 over a plurality of frame periods.
Figure 8:
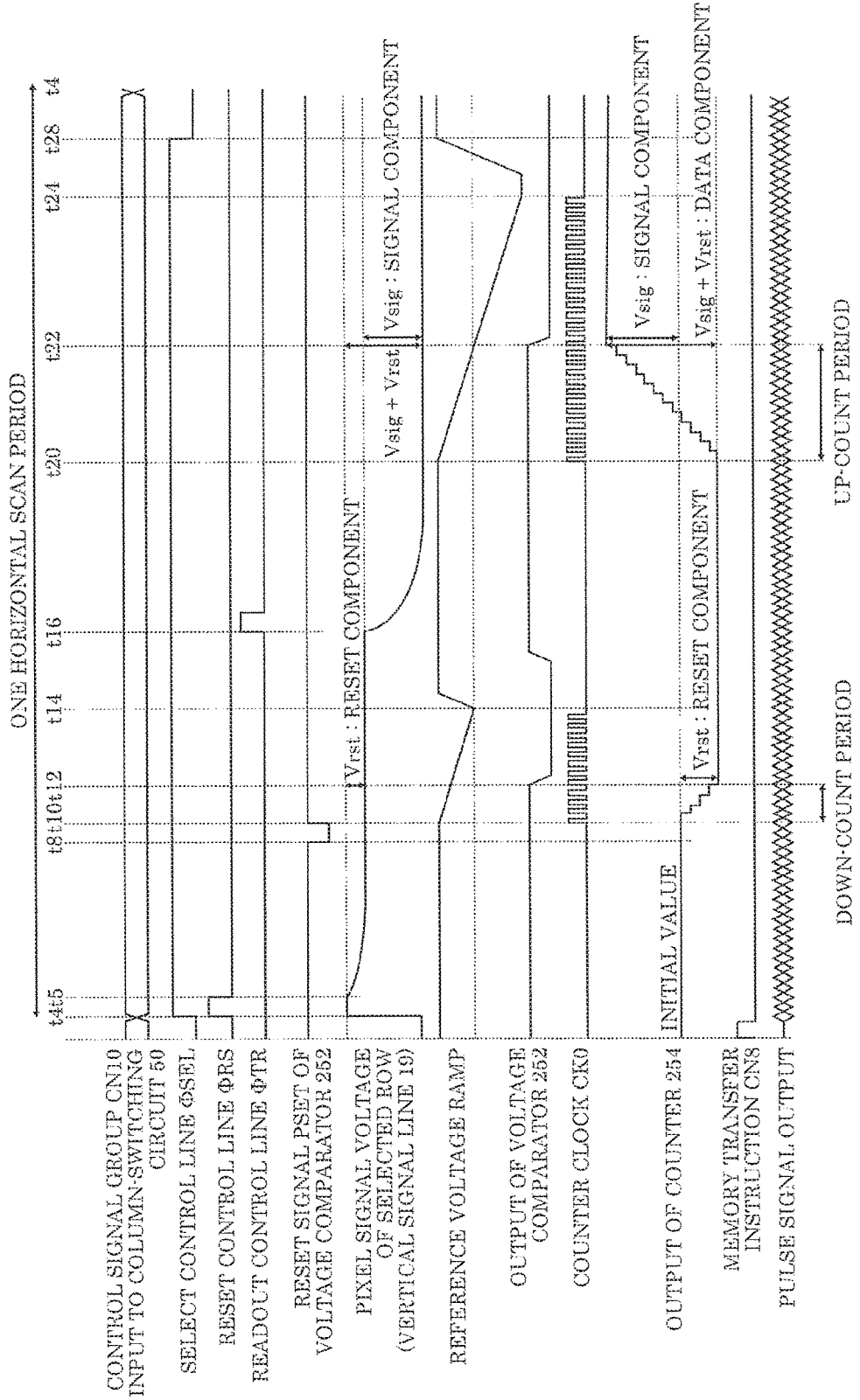
FIG. 8 is a time chart showing an example of operations of the solid-state imaging device according to Embodiment 1 during one horizontal scan period.

FIG. 7 is a time chart showing an example of operations of solid-state imaging device 1 over a plurality of frame periods. In this diagram, the waveform of reference signal RAMP in the k-th to (k+2)th frames is schematically shown. One frame is composed of n horizontal scan periods (period 111 shown in the diagram) corresponding to the first to n-th rows of pixel circuits 3. FIG. 8 is a time chart showing an example of operations of the solid-state imaging device during one horizontal scan period.

In each horizontal scan period, reference signal RAMP has a triangular waveform during a down-count period and an up-count period in FIGS. 7 and 8.

The down-count period is a period during which a first pixel signal indicative of the level of reset component Vrst that is output from amplifier transistor T12 is AD converted. Counter 254 counts down the time from the start of a down-count period (the start of a change in the triangular waveform) until when the output of voltage comparator 252 is inverted. The count value is the result of AD conversion of analog reset component Vrst.

The up-count period is a period during which a second pixel signal indicative of the level of a data component (signal component Vsig+reset component Vrst) that is output from amplifier transistor T12 is AD converted. Counter 254 counts up the time from the start of an up-count period (the start of a change in the triangular waveform) until when the output of voltage comparator 252 is inverted. During the up-count period, the analog data component (Vsig+Vrst) is converted to a digital value. The down-count value indicative of reset component Vrst is set as the initial value during the up-count period, and thus the count value at the end of the up-count period represents the result of correlated double sampling (CDS) in which the reset component is subtracted from the data component. That is, the count value at the end of the up-count period is a digital value representing signal component Vsig. In this way, column AD circuit 25 eliminates column nonuniformities in clock skew and counter delay that can cause errors, and extracts only true signal component Vsig, or in other words, performs digital CDS.

A single frame of image is obtained by sequentially performing, on n rows, the operations as described above during one horizontal scan period.

In FIG. 8, control signal group CN10 is changed for every horizontal scan period. To be more specific, control signal group CN10 is changed at the start of a horizontal scan period (at time t4), and the same logic values are maintained during the horizontal period. Control signal group CN10 may be changed any time before AD conversion during one horizontal period.

As a result of control signal group CN10 being changed, one-to-one connections between columns of pixel circuits 3 in pixel array 10 and column AD circuits 25 can be switched for each row scanned by vertical scan circuit 14, and column-correlated noise and nonuniformities can be reduced. Also, the logic values of control signal group CN10 are maintained during one horizontal scan period, and thus the detection of the first pixel signal and the detection of second first pixel signal in CDS are not affected by the switching.

Here, the reduction of column-correlated noise and nonuniformities by switching performed by column-switching circuit 50 will be described in further detail.

A first main factor for the occurrence of vertical line noise as described above is column nonuniformities in the inversion speeds of voltage comparators 252, and a second main factor is column nonuniformities in the response speeds of vertical signal lines 19.

To address the column nonuniformities in the inversion speeds of voltage comparators 252 that is the first main factor, column-switching circuit 50 switches connections between columns of pixel circuits 3 in pixel array 10 and column AD circuits 25 that correspond thereto before each time AD conversion is performed.

As a result, the same noise is not superimposed on the pixel signals of the same column, and is superimposed on the pixel signals of a different column. As a result, column correlation is eliminated, and vertical line noise that appears on the image obtained as a result of AD conversion is reduced.

The column nonuniformities in the response speeds of vertical signal lines 19 that is the second main factor are generated primarily due to nonuniformities in the current values of load current sources 30. That is, for this reason, column-switching circuit 50 switches connections between columns of pixel circuits 3 in pixel array 10 and load current sources 30 that correspond thereto before each time AD conversion is performed.

This is effective when one horizontal scan period shown in FIG. 8 is short and therefore the time from timing t4 to timing t10 before the down-count period and the time from timing t16 to timing t20 before the up-count period that indicate the response time of vertical signal lines 19 are short, and the column nonuniformities in the response speeds of vertical signal lines 19, which is the second main factor, present a problem.

As a result, the same noise is not superimposed on the pixel signals of the same column, and is superimposed on the pixel signals of a different column. As a result, column correlation is eliminated, and vertical line noise that appears on the image obtained as a result of AD conversion is reduced.

Also, row correlation, which is the problem to be solved by PTL 1, is eliminated, and random horizontal line noise does not occur.

Also, control of column-switching circuit 50 is carried out based on switch control circuit 51 provided in controller 20. In order to eliminate any fixed pattern in the image obtained as a result of AD conversion, the switching performed by column-switching circuit 50 is controlled, for example, based on random number. Practically, as long as periodicity of the random number satisfies several frames×the number of rows, an image with no unnatural impression is obtained.

Column-switching circuit 50 switches connections, for example, at timing t4 based on control signal group CN10 before AD conversion is performed for every horizontal scan period. Then, after AD conversion is performed for every horizontal period, at timing t28, column-switching circuit 50 may be released based on control signal group CN10. In this way, column-switching circuit 50 switches connections for every horizontal scan period.

The reduction of vertical line noise by column-switching circuit 50 performing switching will be described with reference to FIGS. 9A and 9B.

Figure 9A:
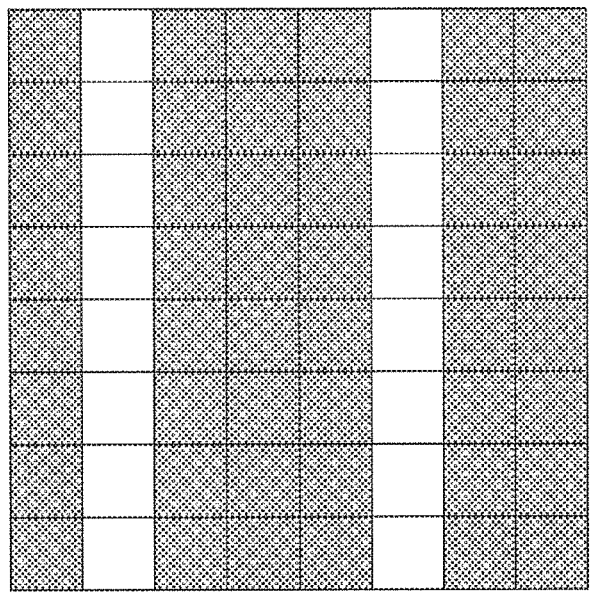
FIG. 9A is a schematic diagram showing an image according to a comparative example.

FIG. 9A is a schematic diagram showing an image according to a comparative example. The diagram schematically shows an image obtained by imaging an object of uniform brightness and color, without switching of connections being performed by column-switching circuit 50. In the case where switching is not performed by column-switching circuit 50, the value that was AD converted by counter 254 during the up-count period and the value that was AD converted by counter 254 during the down-count period have column correlation, and the value obtained by subtracting the down-count value from the up-count value that is a signal component also has column correlation. As a result, vertical line noise as shown in FIG. 9A may occur.

Figure 9B:
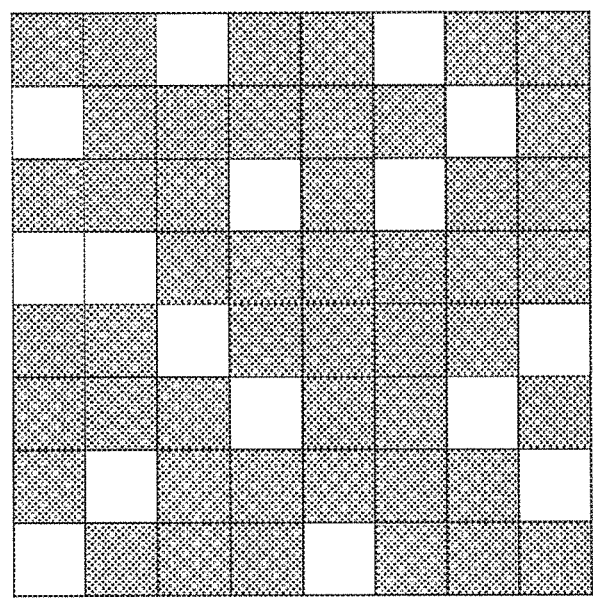
FIG. 9B is a schematic diagram showing an image according to Embodiment 1.

FIG. 9B is a schematic diagram showing an image according to the present embodiment. The diagram schematically shows an shows an image obtained by imaging an object of uniform brightness and color, with switching of connections being performed by column-switching circuit 50 for every horizontal scan period. In the present embodiment, the correspondence relationship between vertical signal lines 19 and column AD circuits 25 varies for each row. As a result, in the image obtained as a result of AD conversion, vertical line noise is reduced as shown in FIG. 9B.

As described above, according to Embodiment 1, by providing column-switching circuit 50 in vertical signal lines 19 between pixel array 10 and column AD circuits 25, it is possible to reduce vertical line noise.

Restoration circuit 52 need not necessarily include a buffer memory that temporarily stores at least N AD converted pixel signals.

For example, restoration circuit 52 may be combined with horizontal scan circuit 12. In this case, horizontal scan circuit 12 may restore the ordering of pixel signals by switching the scan order of memories 256 based on control signal group CN10.

Also, for example, restoration circuit 52 may have a circuit configuration similar to that of column-switching circuit 50, and may be interposed between the output lines of the plurality of memories 256 and horizontal signal line 18. In this case, restoration circuit 52 may be configured to perform switching in reverse order to the switching performed by column-switching circuit 50 based on control signal group CN10.

As described above, solid-state imaging device 1 according to Embodiment 1 includes: pixel array 10 including a plurality of pixel circuits 3 arranged in rows and columns; vertical signal line 19 that is provided for each column and transmits a pixel signal output from the plurality of pixel circuits 3; column AD circuit 25 that is provided for each column and analog-to-digital (AD) converts the pixel signal from vertical signal line 19; column-switching circuit 50 that is interposed in a plurality of vertical signal lines 19 between pixel array 10 and a plurality of column AD circuits 25 and switches connections between the columns of pixel circuits 3 in pixel array 10 and the plurality of column AD circuits 25; controller 20 that causes column-switching circuit 50 to switch the connections for every horizontal scan period; and restoration circuit 52 that restores ordering of the signals AD converted by the plurality of column AD circuits 25 so as to correspond to the ordering in which the plurality of vertical signal lines 19 are arranged in pixel array 10.

With this configuration, by switching the correspondence relationship between columns of pixel circuit 3 in pixel array 10 and column AD circuits 25, vertical line noise can be reduced.

Here, solid-state imaging device 1 may include load current source 30 that is provided for each of the columns, is connected to vertical signal line 19 between column-switching circuit 50 and column AD circuit 25, and supplies a load current to vertical signal line 19.

With this configuration, by switching the correspondence relationship between (i) columns of pixel circuits 3 in pixel array 10 and (ii) load current sources 30 and column AD circuits 25, it is possible to reduce vertical line noise.

Here, solid-state imaging device 1 may include clip transistor 54 that is provided for each of the columns, is connected to vertical signal line 19 between column-switching circuit 50 and column AD circuit 25, and provides a clip potential to the vertical signal line such that load current source 30 is not turned off while column-switching circuit 50 performs switching.

This configuration prevents variations in the power supply voltage and variations in the ground level that may occur by column-switching circuit 50 performing switching, and thus the occurrence of noise can be reduced.

Here, column-switching circuit 50 may include a plurality of unit switching circuits 50a each having N input terminals and N output terminals, where N is an integer of 4 or more, wherein N input terminals of unit switching circuit 50a are connected to N vertical signal lines 19 that are on the side where pixel array 10 is provided, N output terminals of unit switching circuit 50a are connected to N vertical signal lines 19 that are on the side where the plurality of column AD circuits 25 are provided, and each of the plurality of unit switching circuits 50a switches internal connections between N input terminals and N output terminals in accordance with a first control signal group from controller 20.

With this configuration, the plurality of vertical signal lines 19 are divided into groups of N vertical signal lines 19, and thus each unit switching circuit 50a corresponding to N vertical signal lines 19 can share the same control signal group. Also, if N is increased, the number of control signals of the first control signal group increases, and its interconnection area also increases significantly. Accordingly, reducing the magnitude of N (the effect of reducing vertical line noise) and reducing the interconnection area of the control signal group are in a trade-off relationship. By appropriately setting N according to the area of a semiconductor chip on which solid-state imaging device 1 is formed and the total number of pixel circuits, the effect of reducing vertical line noise can be sufficiently obtained.

Here, each unit switching circuit 50a may include K×L selectors each having two input terminals and two output terminals, where K is an integer of 2 or more, L is an integer of 2 or more, and N is 2×K, wherein K×L selectors are arranged in K columns and L rows, input terminals of K selectors in the first row are connected to N vertical signal lines 19 that are on the side where pixel array 10 is provided, output terminals of K selectors in the last row are connected to N vertical signal lines 19 that are on the side where the plurality of column AD circuits 25 are provided, two input terminals of each of selectors in the second and subsequent rows are connected to output terminals of different selectors in the previous row, K×L selectors switch internal connections between two input terminals and two output terminals in accordance with K×L control signals, and the first control signal group includes K×L control signals.

With this configuration, by combining K×L selectors, the design and production of unit switching circuit 50a can be facilitated.

Here, controller 20 may include pseudo random number generator circuit 53 that generates the first control signal group by using a pseudo random number. With this configuration, the effect of reducing vertical line noise can be enhanced.

Here, solid-state imaging device 1 may include horizontal scan circuit 12 that scans the plurality of column AD circuits 25 and thereby causes the plurality of column AD circuits 25 to sequentially output AD converted pixel signals, and restoration circuit 52 may include a buffer memory for temporarily storing at least N AD converted pixel signals that are sequentially output, and restore the ordering of the AD converted pixel signals by changing the readout order from the buffer memory based on the first control signal group.

Embodiment 2

In Embodiment 2, in addition to Embodiment 1, a solid-state imaging device that reduces column correlation will be described.

As described above, the first main factor for the occurrence of vertical line noise is column nonuniformities in the inversion speeds of voltage comparators 252, and the second main factor is column nonuniformities in the response speeds of vertical signal lines 19.

Further reduction of vertical line noise caused by column nonuniformities in the inversion speeds of voltage comparators 252 that is the first main factor will be described. In the solid-state imaging device according to the present embodiment, each voltage comparator 252 includes a comparator current source having switchable current characteristics. With this configuration, the column nonuniformities in the inversion speeds of voltage comparators 252 can be reduced.

Further reduction of vertical line noise caused by column nonuniformities in the response speeds of vertical signal lines 19 that is the second main factor will be described. The solid-state imaging device according to the present embodiment includes load current sources 30 having switchable current characteristics. With this configuration, the column nonuniformities in the response speeds of vertical signal lines 19 can be reduced.

Hereinafter, a configuration of a solid-state imaging device according to Embodiment 2 will be described with reference to the drawings.

Figure 10:
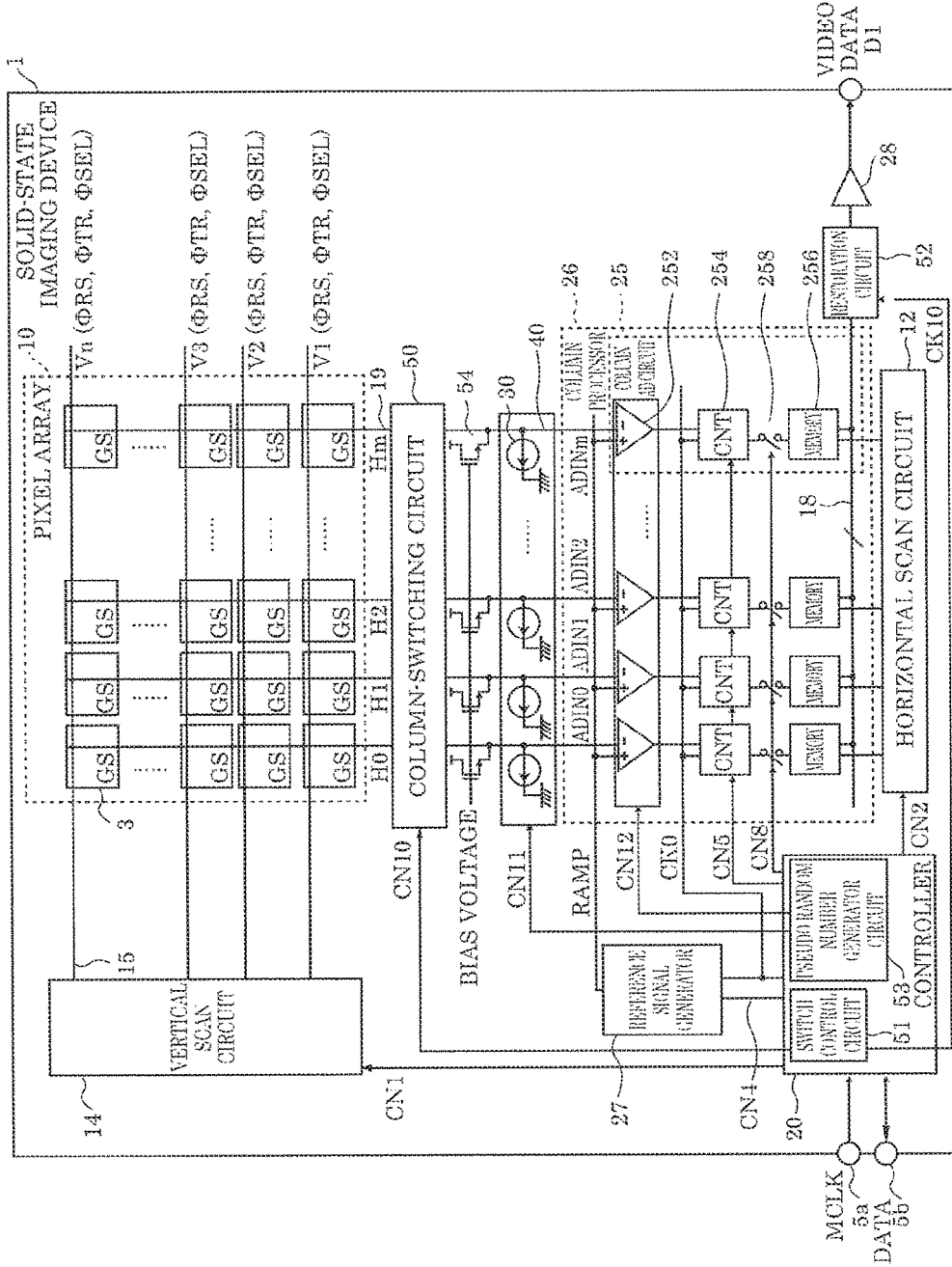
FIG. 10 is a block diagram showing a configuration of a solid-state imaging device according to Embodiment 2.

FIG. 10 is a block diagram showing a configuration example of solid-state imaging device 1 according to Embodiment 2. Solid-state imaging device 1 shown in the diagram is different from that shown in FIG. 1 in that the current characteristics of load current sources 30 can be switched, current characteristics of a comparator current source provided in each voltage comparator 252 can be switched, and pseudo random number generator circuit 53 is added to controller 20. The following description will be given focusing on the differences.

[Configuration Example of Load Current Source]

First, load current sources 30 having switchable current characteristics will be described.

Figure 11:
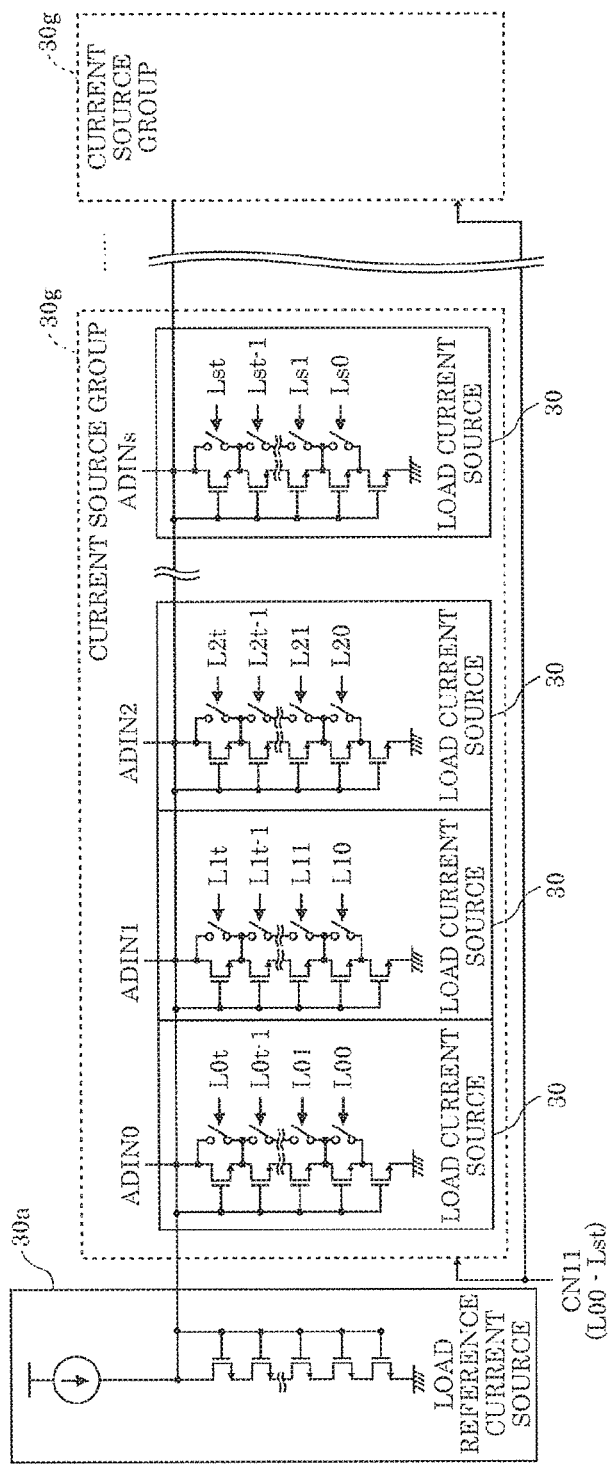
FIG. 11 is a circuit diagram showing an example of a load current source according to Embodiment 2.

FIG. 11 is a circuit diagram showing an example of a plurality of load current sources 30 according to Embodiment 2. Solid-state imaging device 1 includes m load current sources 30, where m is the same as the number of vertical signal lines 19. The diagram shows some of m load current sources 30, and load reference current source 30a.

Load reference current source 30a is a current source serving as a reference for constituting a current mirror with each load current source 30. The diagram shows one load reference current source 30a that is common to all load current sources 30, but a plurality of load reference current sources 30a that are each common to a fixed number of load current sources 30 may be provided.

As shown in the diagram, the plurality of (m) load current sources 30 are divided into a plurality of current source groups 30g.

Each current source group 30g includes s+1 load current sources 30, where s is an integer of 1 or more.

Each load current source (30) includes t+2 transistors and t+1 switch, where t is an integer of 0 or more.

t+2 transistors are cascode connected between vertical signal line 19 and the ground line.

t+1 switch is connected between the drain and the source of t+1 transistor among t+2 transistors.

In each load current source 30, the mirror ratio of the current mirror can be changed by a combination of turning on and off t+1 switch, or in other words, current characteristics (including current value) can be switched.

Each of the plurality of current source group 30g receives an input of control signal group CN11 including (s+1)×(t+1) switch control signals from controller 20. (s+1)×(t+1) switch control signals are supplied to (s+1)×(t+1) switches included in each current source group 30g. Control signal group CN11 is changed by pseudo random number generator circuit 53 before AD conversion is performed for every horizontal scan period. In this way, controller 20 switches the current characteristics of load current sources 30 for every horizontal scan period by randomly determining the logic values of (s+1)×(t+1) switch control signals. The column nonuniformities in the response speeds of vertical signal lines 19 can be thereby reduced.

Also, the plurality of (m) load current sources 30 are grouped into current source groups 30g each including s+1 load current sources 30, and thus each current source group 30g can share the same control signal group CN11. By sharing the control signal group, it is possible to avoid an excessive increase in the number of lines of control signal group CN11. To describe it more specifically, if the number (s+1) of load current sources 30 in each current source group 30g and the number (t+1) of switches in each load current source 30 are increased, the number of control signal lines of control signal group CN11 increases, and its interconnection area also increases significantly. That is, reducing the magnitudes of (s+1) and (t+1) (the effect of reducing nonuniformities in the response speeds of vertical signal lines 19) and reducing the interconnection area of control signal group CN11 are in a trade-off relationship. With respect to the trade-off, by appropriately setting (s+1) and (t+1) according to the area of a semiconductor chip on which solid-state imaging device 1 is formed and the total number of pixel circuits, the effect of reducing vertical line noise can be obtained.

[Configuration Example of Comparator Current Source]

Next, voltage comparator 252 including a comparator current source having switchable current characteristics will be described.

Figure 12:
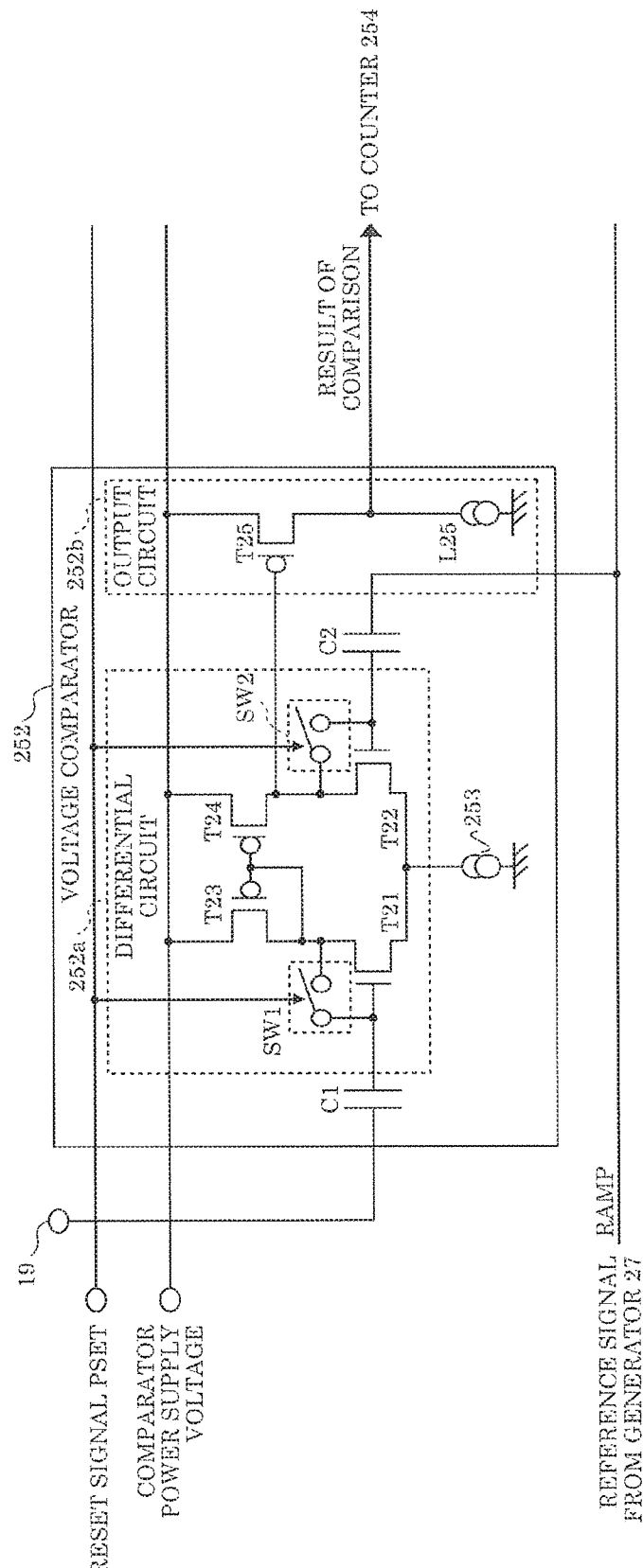
FIG. 12 is a circuit diagram showing an example of a voltage comparator according to Embodiment 2.

FIG. 12 is a circuit diagram showing an example of voltage comparator 252 according to Embodiment 2. Voltage comparator 252 shown in the diagram includes input capacitors C1 and C2, differential circuit 252a, output circuit 252b, and comparator current source 253.

Input capacitor C1 receives input of an analog pixel signal from vertical signal line 19. Input capacitor C2 receives input of reference signal RAMP.

Differential circuit 252a includes four transistors T21 to T24. The analog pixel signal from vertical signal line 19 is input into the gate terminal of transistor T21 via input capacitor C1. Reference signal RAMP is input into the gate terminal of transistor T22 via input capacitor C2. Furthermore, differential circuit 252a also includes switches SW1 and SW2 for resetting input capacitors C1 and C2.

Comparator current source 253 is connected to the source terminals of transistors T21 and T22 of differential circuit 252a. Comparator current source 253 has switchable current characteristics, and controller 20 randomly switches the current characteristics for every horizontal scan period.

Figure 13:
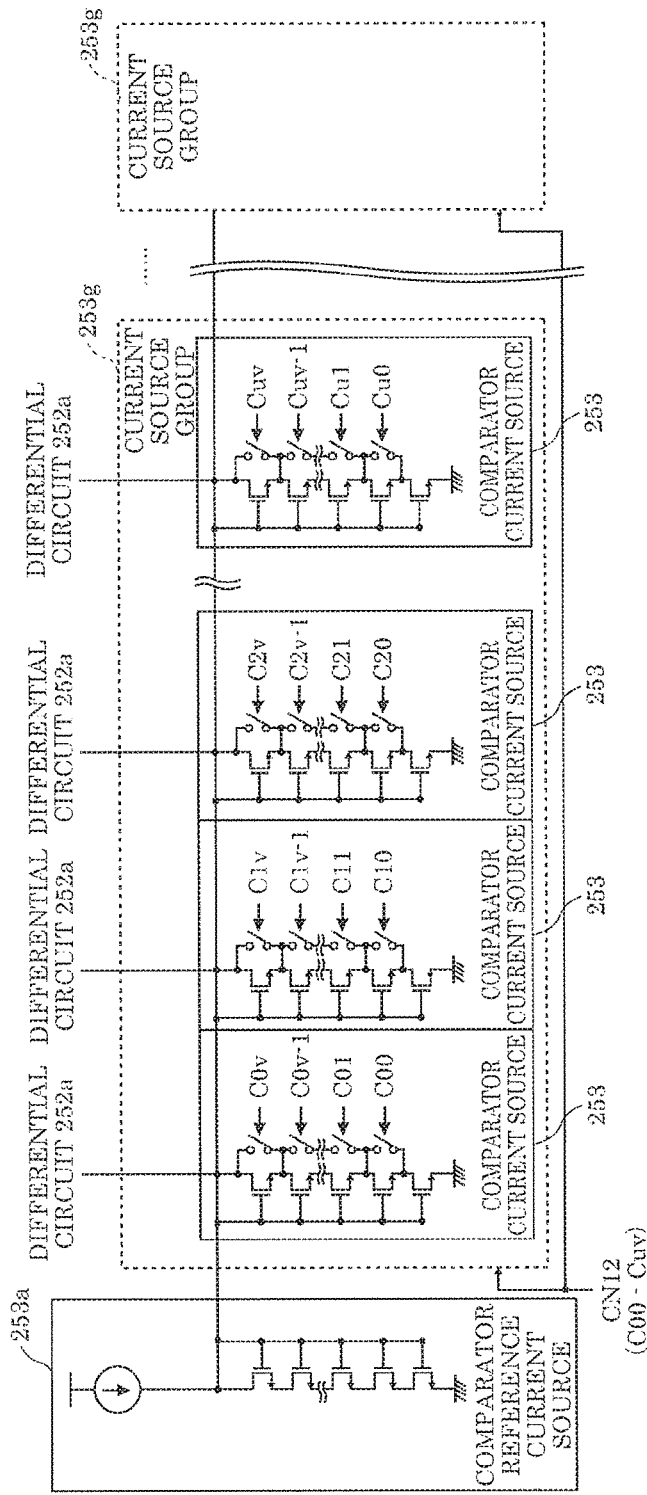
FIG. 13 is a circuit diagram showing an example of a comparator current source according to Embodiment 2.

FIG. 13 is a circuit diagram showing an example of a comparator current source according to Embodiment 2. Solid-state imaging device 1 includes m comparator current sources 253, where m is the same as the number of vertical signal lines 19. The diagram shows some of m comparator current sources 253, and comparator reference current source 253a.

Comparator reference current source 253a is a current source serving as a reference for constituting a current mirror with each comparator current source 253. The diagram shows one comparator reference current source 253a that is common to all comparator current sources 253, but a plurality of comparator reference current sources 253a that are each common to a fixed number of comparator current sources 253 may be provided.

As shown in the diagram, the plurality of (m) comparator current sources 253 are divided into a plurality of current source groups 253g.

Each current source group 253g includes u+1 comparator current sources 253, where u is an integer of 1 or more.

Each comparator current source 253 includes v+2 transistors and v+1 switch, where v is an integer of 0 or more.

v+2 transistors are cascode connected between differential circuit 252a and the ground line.

v+1 switch is connected between the drain and the source of v+1 transistor among v+2 transistors. v+1 switch is controlled by control signal group CN12 including (u+1)×(v+1) switch control signals output from controller 20.

With the configuration as described above, in each comparator current source 253, the mirror ratio of the current mirror can be changed by a combination of turning on and off v+1 switch, or in other words, current characteristics (including current value) can be switched.

(u+1)×(v+1) switch control signals are supplied to (u+1)×(v+1) switches included in each current source group 253g. Controller 20 switches the current characteristics for every horizontal scan period by randomly determining the logic values of (u+1)×(v+1) switch control signals.

As described above, solid-state imaging device 1 according to Embodiment 2 can further reduce column nonuniformities in the inversion speeds of voltage comparators 252, as compared with that of Embodiment 1. It is also possible to reduce column nonuniformities in the response speeds of vertical signal lines 19.

Also, the plurality of (m) comparator current sources 253 are grouped into current source groups 253g each including u+1 comparator current sources 253, and thus each current source group 253g can share the same control signal group CN12. By sharing the control signal group, it is possible to avoid an excessive increase in the number of lines of control signal group CN12. To describe it more specifically, if the number (u+1) of comparator current sources 253 in each current source group 253g and the number (v+1) of switches in each comparator current source 253 are increased, the number of control signal lines of control signal group CN12 increases, and its interconnection area also increases significantly. That is, reducing the magnitudes of (u+1) and (v+1) (the effect of reducing nonuniformities in the response speeds of voltage comparators 252) and reducing the interconnection area of control signal group CN12 are in a trade-off relationship. With respect to the trade-off, by appropriately setting (u+1) and (v+1) according to the area of a semiconductor chip on which solid-state imaging device 1 is formed and the total number of pixel circuits, the effect of reducing vertical line noise can be obtained.

As described above, in the solid-state imaging device according to the present embodiment, each column AD circuit 25 includes voltage comparator 252 that compares a pixel signal from vertical signal line 19 with reference signal RAMP having a triangular waveform, and counter 254 that converts the pixel signal from vertical signal line 19 to a digital value in accordance with inversion of output of voltage comparator 252. Voltage comparator 252 includes differential circuit 252a that receives input of the pixel signal and reference signal RAMP, and comparator current source 253 connected to the differential circuit. Comparator current source 253 has switchable current characteristics, and controller 20 can randomly switch the current characteristics of the plurality of comparator current sources 253 of the plurality of column AD circuits 25 for every horizontal scan period.

With this configuration, the current characteristics of the comparator current sources are randomly switched, and it is thereby possible to further reduce column correlation.

Here, each comparator current source 253 may include v+2 transistors that are cascode connected between differential circuit 252a and the ground line and v+1 switch that is connected between the drain and the source of v+1 transistor among v+2 transistors, where v is an integer of 0 or more. A plurality of comparator current sources 253 may be divided into a plurality of current source groups 253g, each of the plurality of current source groups 253g including u+1 comparator current sources 253, where u is an integer of 1 or more. Controller 20 may output control signal group CN12 including (u+1)×(v+1) switch control signals to each of the plurality of current source groups 253g. (u+1)×(v+1) switch control signals may be supplied to (u+1)×(v+1) switches of each current source group 253g. Controller 20 may switch the current characteristics for every horizontal scan period by randomly determining the logic values of (u+1)×(v+1) switch control signals.

With this configuration, the design and production of comparator current source having switchable current characteristics can be facilitated.

Here, the plurality of load current sources 30 may have switchable current characteristics, and controller 20 may randomly switch the current characteristics of the plurality of load current sources for every horizontal scan period.

With this configuration, the current characteristics of the load current sources are randomly switched, and it is thereby possible to further reduce column correlation.

Here, each load current source 30 may include t+2 transistors that are cascode connected between vertical signal line 19 and the ground line and t+1 switch that is connected between the drain and the source of t+1 transistor among t+2 transistors, where t is an integer of 0 or more. A plurality of load current sources 30 are divided into a plurality of current source groups 30g, each of the plurality of current source groups 30g including s+1 load current sources 30, where s is an integer of 1 or more. Controller 20 may output control signal group CN11 including (s+1)×(t+1) switch control signals to each of the plurality of current source groups 30g. (s+1)×(t+1) switch control signals may be supplied to (s+1)×(t+1) switches of each current source group 30g. Controller 20 may switch the current characteristics for every horizontal scan period by randomly determining the logic values of (s+1)×(t+1) switch control signals.

With this configuration, the design and production of load current source having switchable current characteristics can be facilitated.

Embodiment 3

In Embodiment 3, a solid-state imaging device that improves column nonuniformities in the inversion speeds of voltage comparators 252 that is the first main factor will be described in comparison with Embodiment 1.

Hereinafter, a configuration of a solid-state imaging device according to Embodiment 3 will be described with reference to the drawings.

Figure 14:
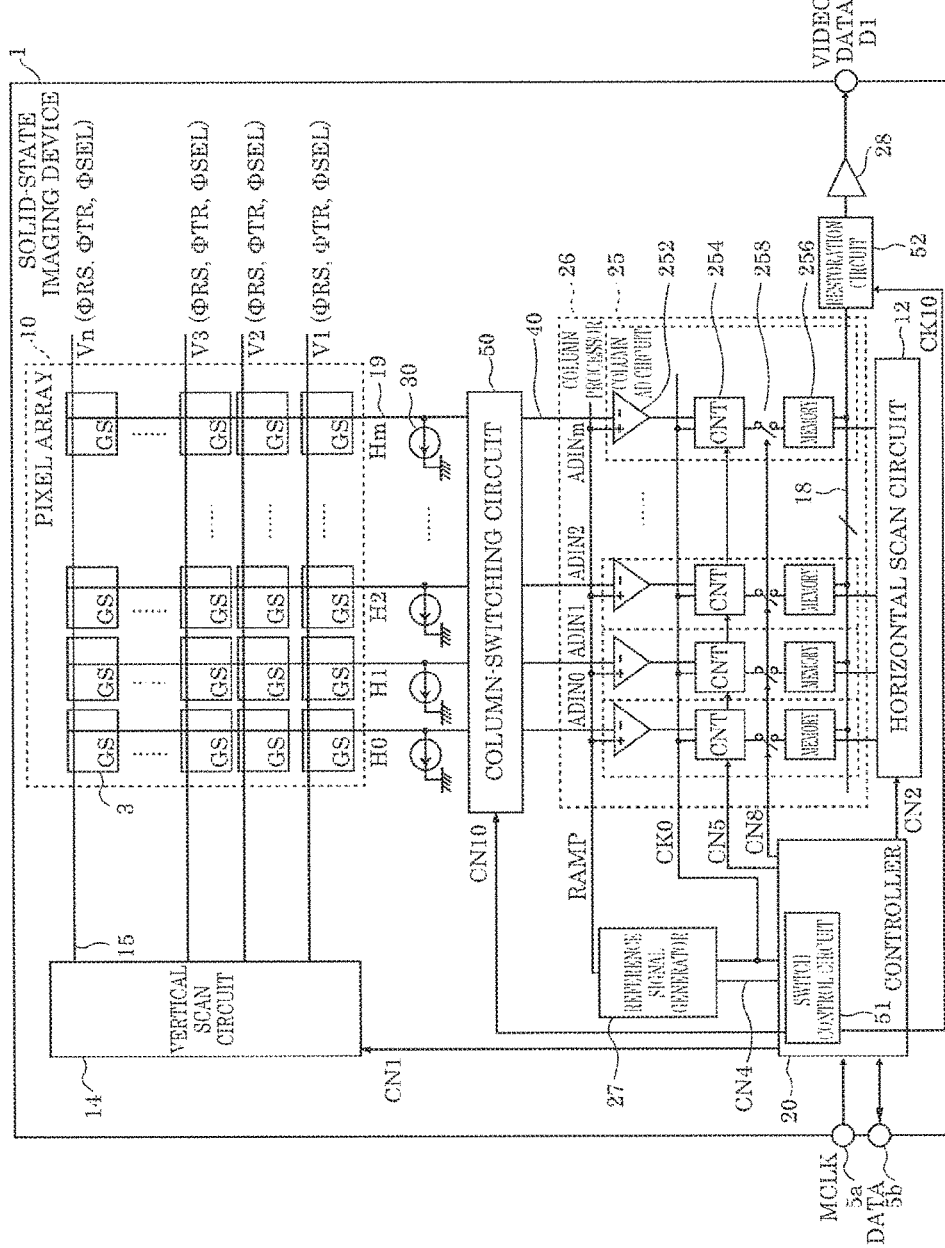
FIG. 14 is a block diagram showing a configuration example of a solid-state imaging device according to Embodiment 3.

FIG. 14 is a block diagram showing a configuration example of solid-state imaging device 1 according to Embodiment 3. Solid-state imaging device 1 shown in the diagram is different from that shown in FIG. 1 in that the position of connection of load current sources 30 to vertical signal lines 19 is upstream of column-switching circuit 50, and clip transistors 54 have been removed. The following description will be given focusing on the differences.

Load current sources 30 are provided for each column and are connected to vertical signal lines 19 between pixel array 10 and column-switching circuit 50.

Also, clip transistors 54 have been removed. The reason is because there is no possibility that load current sources 30 are momentarily turned off, and the power supply of pixel array 10 and GND do not undergo transient variations, and it does not serve as a noise factor.

With solid-state imaging device 1, it is possible to reduce vertical line noise by switching the correspondence relationship between (i) columns including pixel circuits 3 in pixel array 10 and load current sources 30 and (ii) column AD circuits 25.

Also, solid-state imaging device 1 according to the present embodiment is effective when one horizontal scan period shown in the time chart of FIG. 8 is relatively long, the time from timing t4 to timing t10 before the down-count period and the time from timing t16 to timing t20 before the up-count period that indicate the response time of vertical signal lines 19 are long, and the column nonuniformities in the response speeds of vertical signal lines 19, which is the second main factor, do not present a problem.

This is believed to be because even if slight nonuniformities occur in the convergence time of vertical signal lines 19 due to nonuniformities in the current values of load current sources 30, nonuniformities do not occur by sufficiently ensuring the above-described timing.

As described above, solid-state imaging device 1 according to the present embodiment includes load current sources 30 that are provided for each column, are connected to vertical signal lines 19 between pixel array 10 and column-switching circuit 50, and supply a load current to vertical signal lines 19.

Solid-state imaging device 1 according to Embodiment 3 may include, instead of load current sources 30 having unswitchable current characteristics, load current sources 30 of Embodiment 2 having switchable current characteristics.

Embodiment 4

In Embodiment 4, in addition to Embodiment 3, a solid-state imaging device that reduces column nonuniformities will be described. That is, solid-state imaging device 1 that improves column nonuniformities in the inversion speeds of voltage comparators 252 that is the first main factor will be described.

Hereinafter, a configuration of a solid-state imaging device according to Embodiment 4 will be described with reference to the drawings.

Figure 15:
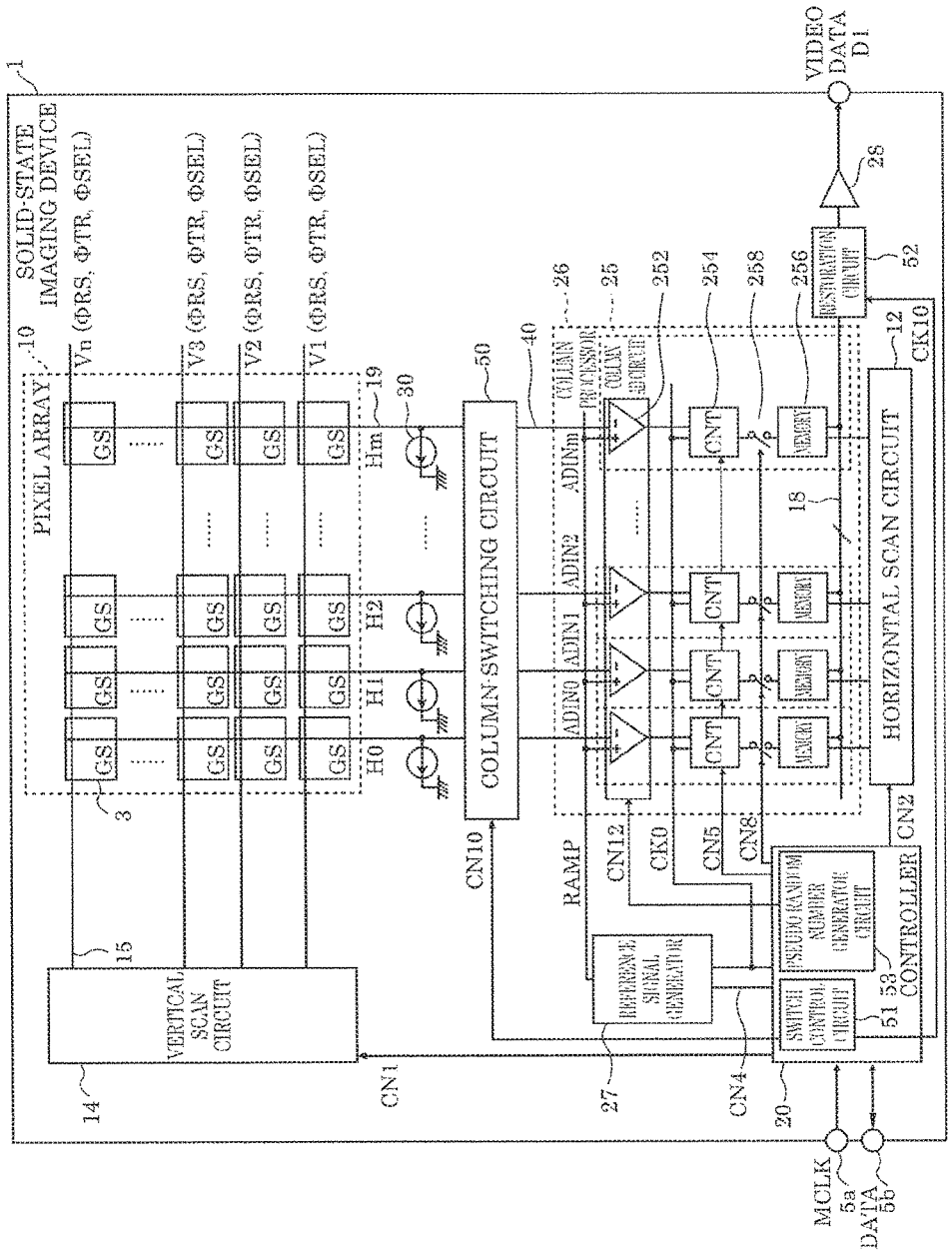
FIG. 15 is a block diagram showing a configuration example of a solid-state imaging device according to Embodiment 4.

FIG. 15 is a block diagram showing a configuration example of solid-state imaging device 1 according to Embodiment 4. Solid-state imaging device 1 shown in the diagram is different from that shown in FIG. 14 in that the comparator current source included in each voltage comparator 252 has switchable current characteristics. The following description will be given focusing on the difference.

Voltage comparator 252 shown in FIG. 15 has the same configuration as that shown in FIG. 12. Comparator current source 253 included in voltage comparator 252 has the same configuration as that shown in FIG. 13.

With this configuration, it is possible to further reduce column nonuniformities in the inversion speeds of voltage comparators 252 that is the first main factor, as compared with Embodiment 3. Also, as compared with Embodiment 2, solid-state imaging device 1 shown in FIG. 15 does not require switching of the current values of load current sources 30 as shown in FIG. 11, and thus it is unnecessary to provide an interconnection space for a total of (s+1)×(t+1) control signals L00 to Lst in control signal group CN11.

Figure 16:
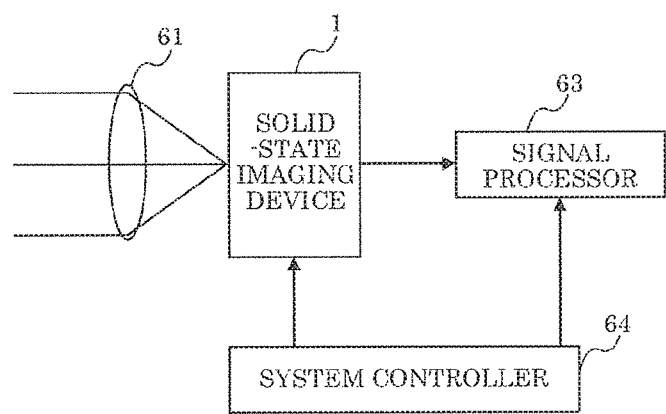
FIG. 16 is a block diagram showing a configuration example of a camera.

Solid-state imaging device 1 described in each embodiment above is used in a camera. FIG. 16 is a block diagram showing a configuration example of a camera. The camera shown in the diagram includes solid-state imaging device 1, lens 61, signal processor 63, and system controller 64.

Also, solid-state imaging device 1 has a structure in which pixel circuits 3 are formed on the surface of a semiconductor substrate, or in other words, pixel circuits 3 are formed on the same surface as that on which the gate terminals of the transistors and interconnection are formed, but may have a structure of a so-called backside illuminated image sensor (backside illuminated solid-state imaging device) in which pixel circuit 3 are formed on the backside surface of a semiconductor substrate, or in other words, pixel circuit 3 are formed on the back side of the surface on which the gate terminals of the transistors and interconnection are formed.

Although only some exemplary embodiments of the present disclosure have been described in detail above, the scope of the claims of the present application is not limited to the exemplary embodiments given above. Those skilled in the art will readily appreciate that many modifications are possible in the exemplary embodiments and other embodiments can be obtained by any combination of the structural elements of the exemplary embodiments without materially departing from the novel teachings and advantages of the present disclosure. Accordingly, all such modifications and other embodiments are also intended to be included within the scope of the present disclosure.

INDUSTRIAL APPLICABILITY

The present disclosure is suitable for use in a solid-state imaging device and a camera.

What is claimed is:

1. A solid-state imaging device, comprising:
a pixel array including a plurality of pixel circuits arranged in rows and columns;
a vertical signal line that is provided for each of the columns and transmits a pixel signal output from the plurality of pixel circuits;
a column AD circuit that is provided for each of the columns and analog-to-digital (AD) converts the pixel signal from the vertical signal line;
a column-switching circuit that is interposed in a plurality of the vertical signal lines between the pixel array and a plurality of the column AD circuits and switches connections between the columns of the pixel circuits in the pixel array and the plurality of the column AD circuits;
a controller that causes the column-switching circuit to switch the connections for every horizontal scan period;
a horizontal scan circuit that scans the plurality of the column AD circuits; and
a restoration circuit that restores ordering of a plurality of the pixel signals that have been AD converted and sequentially output by scanning performed by the horizontal scan circuit so as to correspond to ordering in which the plurality of the vertical signal lines are arranged in the pixel array,
wherein the column-switching circuit includes a plurality of unit switching circuits each having N input terminals and N output terminals, where N is an integer of 4 or more,
wherein the N input terminals of each of the plurality of unit switching circuits are connected to N vertical signal lines that are on a side where the pixel array is provided,
wherein the N output terminals of each of plurality of unit switching circuits are connected to N vertical signal lines that are on a side where the plurality of the column AD circuits are provided,
wherein each of the plurality of unit switching circuits switches internal connections between the N input terminals and the N output terminals in accordance with a first control signal group from the controller,
wherein each of the plurality of unit switching circuits includes K×L selectors each including two input terminals and two output terminals, where K is an integer of 2 or more, L is an integer of 2 or more, and N is 2×K,
wherein the K×L selectors are arranged in K columns and L rows,
wherein input terminals of the K selectors in a first row are connected to the N vertical signal lines that are on the side where the pixel array is provided,
wherein output terminals of the K selectors in a last row are connected to the N vertical signal lines that are on the side where the plurality of the column AD circuits are provided,
wherein two input terminals of each of selectors in second and subsequent rows are connected to output terminals of different selectors in a previous row,
wherein the K×L selectors switch internal connections between two input terminals and two output terminals in accordance with K×L control signals, and
wherein the first control signal group includes the K×L control signals.

2. The solid-state imaging device according to claim 1, comprising a load current source that is provided for each of the columns, is connected to the vertical signal line between the pixel array and the column-switching circuit, and supplies a load current to the vertical signal line.

3. The solid-state imaging device according to claim 1, comprising a load current source that is provided for each of the columns, is connected to the vertical signal line between the column-switching circuit and the column AD circuit, and supplies a load current to the vertical signal line.

4. The solid-state imaging device according to claim 3, comprising a clip transistor that is provided for each of the columns, is connected to the vertical signal line between the column-switching circuit and the column AD circuit, and provides a clip potential to the vertical signal line such that the load current source is not turned off while the column-switching circuit performs switching.

5. The solid-state imaging device according to claim 1,
wherein the column AD circuit includes:
a voltage comparator that compares the pixel signal from the vertical signal line with a reference signal having a triangular waveform; and
a counter that converts the pixel signal from the vertical signal line to a digital value in accordance with inversion of output of the voltage comparator,
wherein the voltage comparator includes:
a differential circuit that receives the pixel signal and the reference signal; and
a comparator current source connected to the differential circuit,
wherein the comparator current source has switchable current characteristics, and
wherein the controller randomly switches the current characteristics for every horizontal scan period.

6. The solid-state imaging device according to claim 1,
wherein a plurality of the load current sources have switchable current characteristics, and
wherein the controller randomly switches the current characteristics for every horizontal scan period.

7. The solid-state imaging device according to claim 1, wherein the restoration circuit includes a buffer memory for temporarily storing AD converted pixel signals that are sequentially output, and restores the ordering of the AD converted pixel signals by changing a readout order from the buffer memory based on the first control signal group.

8. A camera comprising the solid-state imaging device according to claim 1.

9. A solid-state imaging device, comprising:
a pixel array including a plurality of pixel circuits arranged in rows and columns;
a vertical signal line that is provided for each of the columns and transmits a pixel signal output from the plurality of pixel circuits;
a column AD circuit that is provided for each of the columns and analog-to-digital (AD) converts the pixel signal from the vertical signal line;
a column-switching circuit that is interposed in a plurality of the vertical signal lines between the pixel array and a plurality of the column AD circuits and switches connections between the columns of the pixel circuits in the pixel array and the plurality of the column AD circuits;
a controller that causes the column-switching circuit to switch the connections for every horizontal scan period;

a horizontal scan circuit that scans the plurality of the column AD circuits; and
a restoration circuit that restores ordering of a plurality of the pixel signals that have been AD converted and sequentially output by scanning performed by the horizontal scan circuit so as to correspond to ordering in which the plurality of the vertical signal lines are arranged in the pixel array,
wherein the column AD circuit includes:
a voltage comparator that compares the pixel signal from the vertical signal line with a reference signal having a triangular waveform; and
a counter that converts the pixel signal from the vertical signal line to a digital value in accordance with inversion of output of the voltage comparator,
wherein the voltage comparator includes:
a differential circuit that receives the pixel signal and the reference signal; and
a comparator current source connected to the differential circuit,
wherein the comparator current source has switchable current characteristics, and
wherein the controller randomly switches the current characteristics for every horizontal scan period,
wherein the comparator current source includes:
v+2 transistors that are cascode connected between the differential circuit and the ground line, where v is an integer of 0 or more; and
v+1 switch that is connected between a drain and a source of v+1 transistor among the v+2 transistors,
wherein a plurality of the comparator current sources are divided into a plurality of current source groups,
wherein each of the plurality of current source groups includes u+1 comparator current sources, where u is an integer of 1 or more,
wherein the controller outputs a control signal group including (u+1)×(v+1) switch control signals to each of the plurality of current source groups,
wherein the (u+1)×(v+1) switch control signals are supplied to (u+1)×(v+1) switches of each of the current source groups, and
wherein the controller switches the current characteristics for every horizontal scan period by randomly determining logic values of the (u+1)×(v+1) switch control signals.

10. A solid-state imaging device, comprising:
a pixel array including a plurality of pixel circuits arranged in rows and columns;
a vertical signal line that is provided for each of the columns and transmits a pixel signal output from the plurality of pixel circuits;
a column AD circuit that is provided for each of the columns and analog-to-digital (AD) converts the pixel signal from the vertical signal line;
a column-switching circuit that is interposed in a plurality of the vertical signal lines between the pixel array and a plurality of the column AD circuits and switches connections between the columns of the pixel circuits in the pixel array and the plurality of the column AD circuits;
a controller that causes the column-switching circuit to switch the connections for every horizontal scan period;
a horizontal scan circuit that scans the plurality of the column AD circuits;
a restoration circuit that restores ordering of a plurality of the pixel signals that have been AD converted and sequentially output by scanning performed by the horizontal scan circuit so as to correspond to ordering in which the plurality of the vertical signal lines are arranged in the pixel array; and
a load current source that is provided for each of the columns, is connected to the vertical signal line between the column-switching circuit and the column AD circuit, and supplies a load current to the vertical signal line,
wherein a plurality of the load current sources have switchable current characteristics, and
wherein the controller randomly switches the current characteristics for every horizontal scan period,
wherein the load current source includes:
t+2 transistors that are cascode connected between the vertical signal line and a ground line, where t is an integer of 0 or more; and
t+1 switch that is connected between a drain and a source of t+1 transistor among the t+2 transistors,
wherein the plurality of the load current sources are divided into a plurality of current source groups,
wherein each of the plurality of current source groups includes s+1 load current sources, where s is an integer of 1 or more,
wherein the controller outputs a control signal group including (s+1)×(t+1) switch control signals to each of the plurality of current source groups,
wherein the (s+1)×(t+1) switch control signals are supplied to (s+1)×(t+1) switches in each of the plurality of current source groups, and
wherein the controller switches the current characteristics for every horizontal scan period by randomly determining logic values of the (s+1)×(t+1) switch control signals.

11. A solid-state imaging device, comprising:
a pixel array including a plurality of pixel circuits arranged in rows and columns;
a vertical signal line that is provided for each of the columns and transmits a pixel signal output from the plurality of pixel circuits;
a column AD circuit that is provided for each of the columns and analog-to-digital (AD) converts the pixel signal from the vertical signal line; and
a column-switching circuit that is interposed in a plurality of the vertical signal lines between the pixel array and a plurality of the column AD circuits and switches connections between the columns of the pixel circuits in the pixel array and the plurality of the column AD circuits,
wherein the column-switching circuit includes a plurality of unit switching circuits each including N input terminals and N output terminals, where N is an integer of 4 or more,
wherein each of the plurality of unit switching circuits includes K×L selectors each including two input terminals and two output terminals, where K is an integer of 2 or more, L is an integer of 2 or more, and N is 2×K, and
wherein the K×L selectors switch internal connections between the two input terminals and the two output terminals in accordance with K×L control signals.

12. The solid-state imaging device according to claim 11,
wherein the K×L selectors are arranged in K columns and L rows,
wherein input terminals of the K selectors in a first row are connected to the N vertical signal lines that are on the side where the pixel array is provided, wherein output terminals of the K selectors in a last row are connected to the N vertical signal lines that are on the side where the plurality of the column AD circuits are provided, and wherein two input terminals of each of selectors in second and subsequent rows are connected to output terminals of different selectors in a previous row.

13. The solid-state imaging device according to claim 12, comprising
a restoration circuit that restores ordering of a plurality of the pixel signals that have been AD converted and sequentially output by scanning performed by the horizontal scan circuit so as to correspond to ordering in which the plurality of the vertical signal lines are arranged in the pixel array,
wherein the restoration circuit includes a buffer memory for temporarily storing at least N AD converted pixel signals that are sequentially output, and restores the ordering of the AD converted pixel signals by changing a readout order from the buffer memory.

14. The solid-state imaging device according to claim 11, comprising
a restoration circuit that restores ordering of a plurality of the pixel signals that have been AD converted and sequentially output by scanning performed by the horizontal scan circuit so as to correspond to ordering in which the plurality of the vertical signal lines are arranged in the pixel array,
wherein the restoration circuit includes a buffer memory for temporarily storing at least N AD converted pixel signals that are sequentially output, and restores the ordering of the AD converted pixel signals by changing a readout order from the buffer memory.

* * * * *